US012712702B2

(12) United States Patent
Khoshnevisan et al.

(10) Patent No.: US 12,712,702 B2
(45) Date of Patent: Aug. 18, 2026

(54) USER EQUIPMENT TRANSMIT/RECEIVE CALIBRATION IN TIME DIVISION DUPLEXING USING ASSISTANCE INFORMATION

(71) Applicant: QUALCOMM Incorporated, San Diego, CA (US)

(72) Inventors: Mostafa Khoshnevisan, San Diego, CA (US); Xiaoxia Zhang, San Diego, CA (US); Yi Huang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 334 days.

(21) Appl. No.: 18/362,792

(22) Filed: Jul. 31, 2023

(65) Prior Publication Data

US 2025/0047460 A1 Feb. 6, 2025

(51) Int. Cl.
*H04L 5/14* (2006.01)
*H04B 1/44* (2006.01)
*H04B 7/06* (2006.01)
*H04L 25/02* (2006.01)
*H04L 25/03* (2006.01)

(52) U.S. Cl.
CPC ............ *H04L 5/1461* (2013.01); *H04B 1/44* (2013.01)

(58) Field of Classification Search
CPC ............... H04L 5/1461; H04L 25/0398; H04L 25/0224; H04B 1/44; H04B 7/0626; H04B 7/06966
See application file for complete search history.

(56) References Cited

U.S. PATENT DOCUMENTS 11,671,157 B2 * 6/2023 Nammi ................. H04L 5/0048 370/252
11,930,518 B2 * 3/2024 Matsumura ........... H04L 5/0057
(Continued)

FOREIGN PATENT DOCUMENTS

WO 2018175407 A1 9/2018

OTHER PUBLICATIONS

Haghighat A., "UE Calibration in MIMO Systems", Vehicular Technology Conference (VTC Fall), 2012 IEEE, IEEE, Sep. 3, 2012, 4 Pages, XP032294552, the whole document.
(Continued)

*Primary Examiner* — Harry H Kim
(74) *Attorney, Agent, or Firm* — Harrity & Harrity LLP

(57) ABSTRACT

Various aspects of the present disclosure generally relate to wireless communication. In some aspects, a transmit/receive (Tx/Rx) imbalance associated with a user equipment (UE) may be calibrated. For example, in some aspects, the UE may transmit a sounding reference signal (SRS) to an assisting node, which may provide the UE with assistance information indicating a received version of the SRS or an estimated effective channel based on the SRS transmission, which the UE may then use to calculate one or more Tx/Rx imbalance values. Additionally or alternatively, the UE may receive a reference signal from the assisting node and provide feedback to the assisting node, and the assistance information may indicate the one or more Tx/Rx imbalance values to the UE. In either case, the UE may then use the one or more Tx/Rx imbalance values to select a precoder for a transmission to the assisting node.

30 Claims, 7 Drawing Sheets

(56) References Cited

U.S. PATENT DOCUMENTS

| | | | | |
|---|---|---|---|---|
| 12,452,802 | B2 * | 10/2025 | Tervo | H04W 52/367 |
| 2010/0260060 | A1 * | 10/2010 | Abraham | H04W 28/18 370/252 |
| 2018/0279311 | A1 * | 9/2018 | Yoo | H04B 17/11 |
| 2020/0076483 | A1 * | 3/2020 | Zhang | H04B 17/21 |
| 2021/0314041 | A1 * | 10/2021 | Chang | H04B 7/0617 |
| 2022/0376768 | A1 * | 11/2022 | Harrebek | H04B 7/088 |
| 2023/0036683 | A1 * | 2/2023 | Karri | H04B 7/0626 |

OTHER PUBLICATIONS

International Search Report and Written Opinion—PCT/US2024/035519—ISA/EPO—Oct. 16, 2024.

Nterdigital Communications: "Impact of UE Calibration in a Reciprocity-based UL MIMO Transmission", 3GPP TSG RAN WG1 Meeting #88, R1-1702322, 3rd Generation Partnership Project, Mobile Competence Centre, 650, Route Des Lucioles, F-06921 Sop vol. RAN WG1, No. Athens, Greece, Feb. 13, 2017-Feb. 17, 2017, Feb. 12, 2017, 6 Pages, XP051209476, the whole document.

* cited by examiner

USER EQUIPMENT TRANSMIT/RECEIVE CALIBRATION IN TIME DIVISION DUPLEXING USING ASSISTANCE INFORMATION

FIELD OF THE DISCLOSURE

Aspects of the present disclosure generally relate to wireless communication and specifically relate to techniques, apparatuses, and methods associated with user equipment (UE) transmit/receive (Tx/Rx) calibration in time division duplexing (TDD) using assistance information.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (V2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

In a time division duplexing (TDD) system, channel reciprocity generally refers to the property of a wireless (over-the-air) communication channel in which uplink and downlink channels experience similar propagation characteristics in both communication directions. For example, channel conditions that are observed in an uplink direction (from a UE to a network node) are highly correlated with channel conditions that are observed in a downlink direction (from the network node to the UE) due to the uplink and downlink channels sharing a physical medium and propagation environment. Channel reciprocity has an important role in increasing the efficient use of resources in a TDD system, because channel estimation and equalization can be performed in a downlink direction using information received in an uplink transmission (and vice versa), and such information can then be used to optimize transmission in the downlink direction (and vice versa). For example, the channel reciprocity property can be used to enable reciprocity-based beamforming and/or precoding in a TDD-based MIMO system. For example, in a downlink direction, a network node may receive a sounding reference signal (SRS) from a UE, which may be used to estimate the uplink channel. Assuming that the uplink and downlink channels are reciprocal, the network node can then obtain a precoding for one or more downlink transmissions (for example, a physical downlink shared channel (PDSCH) transmission or a channel state information reference signal (CSI-RS) transmission) based on the estimated uplink channel. Similarly, in an uplink direction, the UE may receive a CSI-RS from the network node, which may be used to estimate the downlink channel. Assuming that the uplink and downlink channels are reciprocal, the UE can then obtain a precoding for one or more uplink transmissions (for example, a physical uplink shared channel (PUSCH) transmission or an SRS transmission) based on the estimated downlink channel. Furthermore, channel reciprocity may be applicable to other TDD communication systems, such as sidelink communication between UEs.

In practice, however, each node that communicates over a wireless channel in a TDD system (for example, a network node and a UE, or a first UE and a second UE) introduces a transmit/receive (Tx/Rx) mismatch, such as an amplitude and phase perturbation, to the signals that are transmitted and received over the wireless channel. As a result, despite the fact that the propagation channels are reciprocal, components included in transceiver RF chains (for example, power amplifiers, low noise amplifiers, and/or RF mixers and filters, among other examples) are often not identical across Tx and Rx branches. The difference between the components in the Tx and Rx branches creates a difference between Tx and Rx responses, or a Tx/Rx mismatch, whereby effective downlink and uplink channels between any two given antennas may not be reciprocal. Accordingly, in some cases, there may be a need to perform Tx/Rx calibration in a TDD system. For example, Tx/Rx calibration may include techniques to measure an effective imbalance between Tx and Rx antennas and compensate for the effective imbalance when selecting or configuring a precoder. In other words. Tx/Rx calibration techniques can be used to make effective downlink and uplink channels (or transmission and reception channels) reciprocal in a TDD system, which allows a transmitter (for example, a network node for downlink, or a UE for uplink or sidelink) to obtain the channel based on a received reference signal and derive the precoding based on the obtained channel. For example, in some cases, a network node may perform self-calibration using additional hardware, such as an extra antenna that a network node uses to calibrate an antenna array. Additionally or alternatively, the network node may perform over-the-air calibration, where one or more assisting nodes (for example, other network nodes or UEs) provide assistance information that the network node can use to obtain one or more Tx/Rx imbalance values. However, self-calibration is difficult or impractical for a UE due to the need for additional hardware. Furthermore, wireless networks currently lack support for over-the-air techniques to perform Tx/Rx calibration at a UE.

SUMMARY

Some aspects described herein relate to a user equipment (UE) for wireless communication. The UE may include a processing system that includes one or more processors and one or more memories coupled with the one or more processors. The processing system may be configured to cause the UE to receive, from an assisting node, assistance information that relates to a transmit/receive (Tx/Rx) mismatch associated with the UE. The processing system may be configured to cause the UE to obtain one or more Tx/Rx imbalance values associated with the UE in accordance with the assistance information received from the assisting node. The processing system may be configured to cause the UE to estimate an effective uplink channel in accordance with a downlink channel estimate associated with a downlink reference signal and in accordance with the one or more Tx/Rx imbalance values associated with the UE. The processing system may be configured to cause the UE to transmit an uplink communication using a precoder associated with the estimated effective uplink channel.

Some aspects described herein relate to a method for wireless communication by a UE. The method may include receiving, from an assisting node, assistance information that relates to a Tx/Rx mismatch associated with the UE. The method may include obtaining one or more Tx/Rx imbalance values associated with the UE in accordance with the assistance information received from the assisting node. The method may include estimating an effective uplink channel in accordance with a downlink channel estimate associated with a downlink reference signal and in accordance with the one or more Tx/Rx imbalance values associated with the UE. The method may include transmitting an uplink communication using a precoder associated with the estimated effective uplink channel.

Some aspects described herein relate to a non-transitory computer-readable medium that stores a set of instructions for wireless communication by a one or more instructions that, when executed by one or more processors of a UE. The set of instructions, when executed by one or more processors of the one or more instructions that, when executed by one or more processors of a UE, may cause the one or more instructions that, when executed by one or more processors of a UE to receive, from an assisting node, assistance information that relates to a Tx/Rx mismatch associated with the UE. The set of instructions, when executed by one or more processors of the one or more instructions that, when executed by one or more processors of a UE, may cause the one or more instructions that, when executed by one or more processors of a UE to obtain one or more Tx/Rx imbalance values associated with the UE in accordance with the assistance information received from the assisting node. The set of instructions, when executed by one or more processors of the one or more instructions that, when executed by one or more processors of a UE, may cause the one or more instructions that, when executed by one or more processors of a UE to estimate an effective uplink channel in accordance with a downlink channel estimate associated with a downlink reference signal and in accordance with the one or more Tx/Rx imbalance values associated with the UE. The set of instructions, when executed by one or more processors of the one or more instructions that, when executed by one or more processors of a UE, may cause the one or more instructions that, when executed by one or more processors of a UE to transmit an uplink communication using a precoder associated with the estimated effective uplink channel.

Some aspects described herein relate to an apparatus for wireless communication. The apparatus may include means for receiving, from an assisting node, assistance information that relates to a Tx/Rx mismatch associated with the apparatus. The apparatus may include means for obtaining one or more Tx/Rx imbalance values associated with the apparatus in accordance with the assistance information received from the assisting node. The apparatus may include means for estimating an effective uplink channel in accordance with a downlink channel estimate associated with a downlink reference signal and in accordance with the one or more Tx/Rx imbalance values associated with the apparatus. The apparatus may include means for transmitting an uplink communication using a precoder associated with the estimated effective uplink channel.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

DETAILED DESCRIPTION

Figure 1:
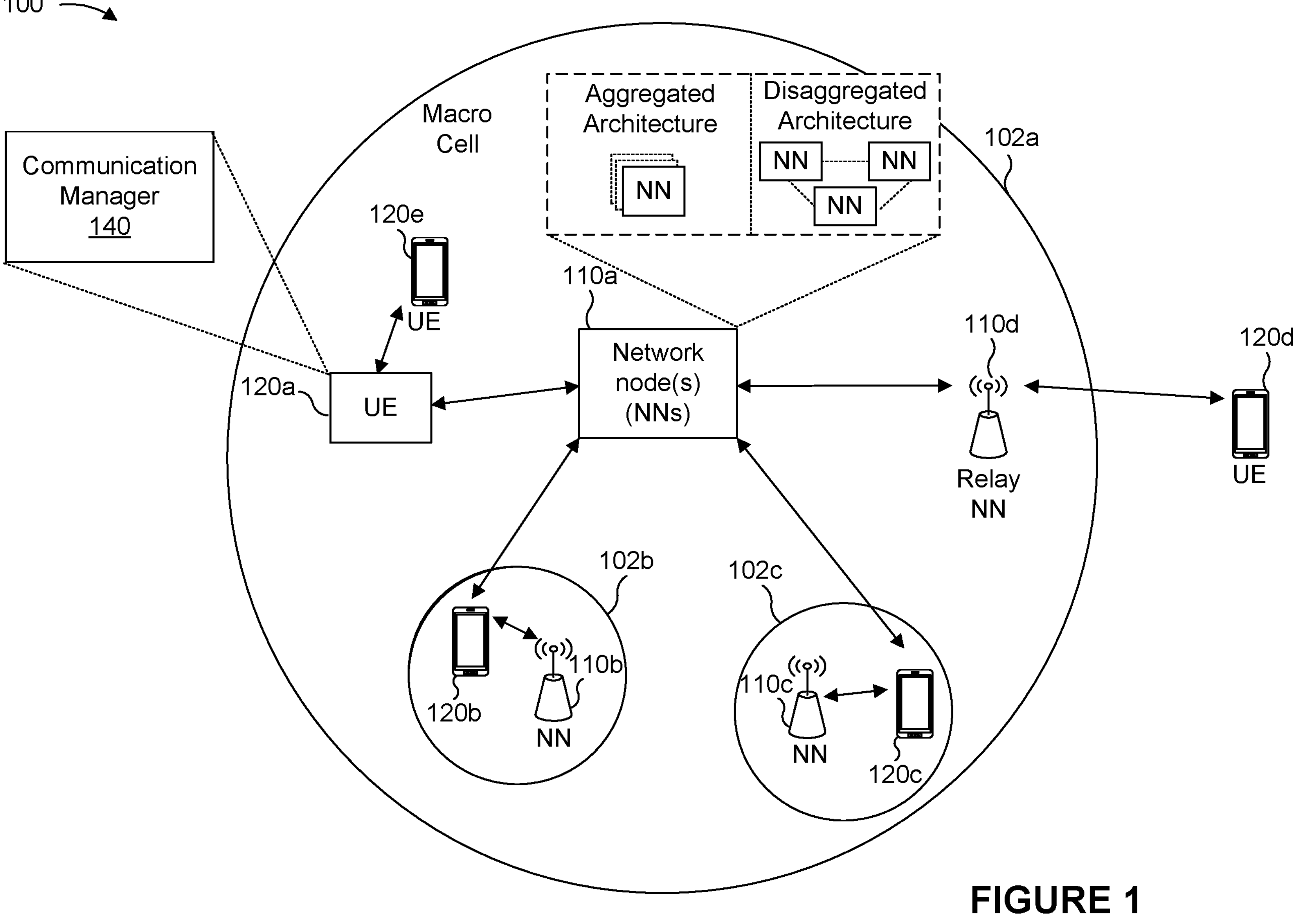
FIG. 1 is a diagram illustrating an example of a wireless network in accordance with the present disclosure.

Various aspects of the present disclosure are described hereinafter with reference to the accompanying drawings.

However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to over-the-air techniques for performing Tx/Rx calibration at a UE using assistance information provided by an assisting node (for example, a network node that communicates with the UE over an access link or a nearby UE that communicates with the UE over a sidelink). Some aspects more specifically relate to techniques that may enable a UE to obtain one or more Tx/Rx imbalance values. For example, in some aspects, the over-the-air techniques described herein may enable the UE to obtain a Tx/Rx imbalance matrix that contains the one or more Tx/Rx imbalance values. Additionally or alternatively, a dimension of the Tx/Rx imbalance matrix (or the number of values included in the Tx/Rx imbalance matrix) may correspond to the number of antennas at the UE, and each Tx/Rx imbalance value may be a complex value that includes a gain imbalance component and a phase imbalance component. For example, in a first approach, the UE may transmit a reference signal to the assisting node, and the assisting node may then transmit, to the UE, assistance information that indicates a received version of the reference signal or an effective channel that is estimated according to the received version of the reference signal. The assisting node may further transmit a reference signal to the UE, and the UE may then calculate or otherwise obtain the Tx/Rx imbalance values based on the assistance information provided by the assisting node and an effective channel that is estimated based on the reference signal transmitted by the assisting node. Additionally or alternatively, in a second approach, the assisting node may transmit a reference signal to the UE, and the UE may provide the assisting node with feedback that indicates a received version of the reference signal or an effective channel that is estimated according to the received version of the reference signal. The UE may further transmit a reference signal to the assisting node, and the assisting node may then calculate or otherwise obtain the Tx/Rx imbalance values based on the feedback provided by the UE and an effective channel that is estimated based on the reference signal transmitted by the UE. The assisting node may then indicate the Tx/Rx imbalance values to the UE. In either case, the UE may then perform reciprocity-based MIMO operation, selecting a precoder for a transmitted signal, based on the Tx/Rx imbalance values and an estimated effective channel that is based on a reference signal transmission by the assisting node. Some aspects described herein additionally relate to capability signaling and/or dynamic signaling to enable and/or configure the Tx/Rx calibration, and to techniques that may allow for joint Tx/Rx calibration at the UE and the assisting node.

Particular aspects of the subject matter described in this disclosure can be implemented to realize one or more of the following potential advantages. In some examples, the described techniques can be used to calibrate a Tx/Rx mismatch that creates a difference between Tx and Rx responses at a UE, which otherwise prevents the UE from performing reciprocity-based transmission. For example, the techniques described herein can be used to measure the effective imbalance between Tx and Rx antennas at a UE and to compensate for the effective imbalance between the Tx and Rx antennas such that the UE can perform reciprocity-based MIMO transmission. For example, as described herein, reciprocity-based MIMO transmission may offer various potential advantages, including an ability to perform channel estimation and equalization for a transmission using information associated with a received reference signal, which eliminates or reduces the need for explicit measurements of the transmission channel and/or reduces the overhead in acquiring channel state information, which may lead to improved spectral efficiency and overall performance in a TDD system.

Multiple-access radio access technologies (RATs) have been adopted in various telecommunication standards to provide common protocols that enable different wireless communication devices to communicate on a municipal, national, regional, or global level. For example, New Radio (NR), also be referred to as 5G, is part of a continuous mobile broadband evolution promulgated by the Third Generation Partnership Project (3GPP) to better support Internet of things (IoT) and reduced capability (RedCap) device deployments, industrial connectivity, millimeter wave (mmWave) expansion, licensed and unlicensed spectrum access, non-terrestrial network (NTN) deployment, sidelink and other device-to-device direct communication technologies, massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other RATs such as 6G may be introduced, to further advance mobile broadband evolution (for example, to support full-duplexing or other advanced duplexing schemes, artificial intelligence or machine learning, cooperative communications, massive and ambient IoT, enhanced modulation and coding, new frequency bands, overlapping spectrum use, and extended reality (XR), among other examples).

FIG. 1 is a diagram illustrating an example of a wireless communication network 100 in accordance with the present disclosure. The wireless communication network 100 may be or may include elements of a 5G (or NR) network or a 6G network, among other examples. The wireless communication network 100 may include multiple network nodes 110 (also referred to as network entities), shown as a network node (NN) 110*a*, a network node 110*b*, a network node 110*c*, and a network node 110*d*. The network nodes 110 may support communications with multiple UEs 120, shown as a UE 120*a*, a UE 120*b*, a UE 120*c*, a UE 120*d*, and a UE 120*c*.

A network node 110 may include one or more devices or systems that enable communication between a UE 120 and one or more components of the wireless communication network 100. A network node 110 may be, may include, or may be referred to as, an NR network node, a 5G network node, a 6G network node, a Node B, an eNB (for example, in 4G), a gNB (for example, in 5G), an access point (AP), a transmission reception point (TRP), a mobility element of a network, a core network node, a network element, a network equipment, and/or another type of device or devices included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full protocol stack (such as a full gNB protocol stack), or a collection of devices or systems that collectively implement the full protocol stack. For example, and as shown, a network node 110 may be an aggregated network node, meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may use a protocol stack that is physically distributed and/or logically distributed among two or more nodes in the same geographic location or in different geographic locations. In some deployments, disaggregated network nodes 110 may be used in an integrated access and backhaul (IAB) network, in an open radio access network (O-RAN), such as the network configuration sponsored by the O-RAN Alliance, or in a virtualized radio access network (vRAN), also known as a cloud radio access network (C-RAN), to facilitate scaling of communication systems by separating base station functionality into multiple units that can be individually deployed.

The network nodes 110 of the wireless communication network 100 may include one or more central units (CUs), one or more distributed units (DUs), and/or one or more radio units (RUS). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a medium access control (MAC) layer, and/or one or more high physical (PHY) layers depending, at least in part, on a functional split, such as a functional split defined by the Third Generation Partnership Project (3GPP). In some examples, a DU also may host one or more low PHY layer functions, such as a fast Fourier transform (FFT), an inverse FFT (iFFT), beamforming, physical random access channel (PRACH) extraction and filtering, and/or scheduling of resources for one or more UEs 120, among other examples. An RU may host RF processing functions or low PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a network node 110 may include a combination of one or more CUs, one or more DUs, and/or one or more RUs. Additionally or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink channels may include one or more control channels and one or more data channels. A downlink control channel may be used to transmit downlink control information (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more physical downlink control channels (PDCCHs), and downlink data channels may include one or more physical downlink shared channels (PDSCHs). Uplink channels may similarly include one or more control channels and one or more data channels. An uplink control channel may be used to transmit uplink control information (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more physical uplink control channels (PUCCHs), and uplink data channels may include one or more physical uplink shared channels (PUSCHs). The downlink and the uplink may each include a set of resources on which the network node 110 and the UE 120 may communicate.

In various examples, some of the network nodes 110 and the UEs 120 of the wireless communication network 100 may be configured for full-duplex operation in addition to half-duplex operation. A network node 110 or a UE 120 operating in a half-duplex mode may perform only one of transmission or reception during particular time resources, such as during particular slots, symbols, or other time periods. Half-duplex operation may involve time-division duplexing (TDD), in which DL transmissions of the network node 110 and UL transmissions of the UE 120 do not occur in the same time resources (that is, the transmissions do not overlap in time). In contrast, a network node 110 or a UE 120 operating in a full-duplex mode can transmit and receive communications concurrently (for example, in the same time resources). By operating in a full-duplex mode, network nodes 110 and/or UEs 120 may generally increase the capacity of the network and the radio access link. In some examples, full-duplex operation may involve frequency-division duplexing (FDD), in which DL transmissions of the network node 110 are performed in a first frequency band or on a first component carrier and transmissions of the UE 120 are performed in a second frequency band or on a second component carrier different than the first frequency band or the first component carrier, respectively. In some examples, full-duplex operation may be enabled for a UE 120 but not for a network node 110. For example, a UE 120 may simultaneously transmit an UL transmission to a first network node 110 and receive a DL transmission from a second network node 110 in the same time resources. In some other examples, full-duplex operation may be enabled for a network node 110 but not for a UE 120. For example, a network node 110 may simultaneously transmit a DL transmission to a first UE 120 and receive an UL transmission from a second UE 120 in the same time resources. In some other examples, full-duplex operation may be enabled for both a network node 110 and a UE 120.

In some examples, the UE 120 and the network node 110 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO). Some radio access technologies (RATs) may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT). Furthermore, in a wireless local area network (WLAN), one or more access points (APs) and one or more stations (STAs) that include multiple antennas also may support spatial multiplexing, which may be used to increase the spectral efficiency and the resultant throughput of a transmission. To implement spatial multiplexing, the transmitting device divides the data stream into a quantity of separate, independent spatial streams that are then separately encoded and transmitted in parallel via the multiple transmit antennas.

As described above, in some aspects, the wireless communication network 100 may be, may include, or may be included in, an IAB network. In an IAB network, at least one network node 110 is an anchor network node that communicates with a core network. An anchor network node 110 may also be referred to as an IAB donor (or "IAB-donor"). The IAB donor 110 may connect to the core network via a wired backhaul link. For example, an Ng interface of the IAB donor 110 may terminate at the core network. Additionally or alternatively, an IAB donor 110 may connect to one or more devices of the core network that provide a core access and mobility management function (AMF). An IAB network also generally includes multiple non-anchor network nodes 110, which may also be referred to as relay network nodes or simply as IAB nodes (or "IAB-nodes"). Each IAB node 110 may communicate directly with the IAB donor 110 via a wireless backhaul link to access the core network, or may communicate indirectly with the IAB donor 110 via one or more other IAB nodes 110 and associated wireless backhaul links that form a backhaul path to the core network. Some IAB donors 110 or other IAB nodes 110 may also communicate directly with one or more UEs 120 via wireless access links that carry access traffic. In some examples, network resources for wireless communication (such as time resources, frequency resources, and/or spatial resources) may be shared between access links and backhaul links.

An IAB donor 110 may include a CU, which may perform access node controller (ANC) functions and/or AMF functions. The CU may configure a DU of the IAB donor 110 and/or may configure one or more IAB nodes 110 (for example, a mobile termination (MT) function and/or a DU function of each of the IAB nodes) that connect to the core network via the IAB donor 110. Thus, a CU of an IAB donor 110 may control and/or configure the entire IAB network (or a portion thereof) that connects to the core network via the IAB donor 110, such as by using control messages and/or configuration messages (for example, an RRC configuration message or an F1 application protocol (F1AP) message).

An IAB node 110 other than an IAB donor 110 also may control and/or schedule communications for a second IAB node 110 (for example, when the IAB node provides DU functions for the MT functions of the second IAB node). In such deployments, the first IAB node 110 may be referred to as a parent IAB node of the second IAB node 110, and the second IAB node 110 may be referred to as a child IAB node of the first IAB node 110. Similarly, a child IAB node of the second IAB node 110 may be referred to as a grandchild IAB node of the first IAB node 110. A DU function of a parent IAB node may control and/or schedule communications for child IAB nodes of the parent IAB node. In some examples, a DU function may exercise limited control over communications of a grandchild node, such as via indication of soft resources or restricted beams at a child node associated with the grandchild node. In some examples, an IAB node 110 that implements a DU function may be referred to as a scheduling node or a scheduling component, and an IAB node 110 that implements an MT function may be referred to as a scheduled node or a scheduled component.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In this case, the wireless communication network 100 may include or be referred to as a "multi-hop network." In the example shown in FIG. 1, the network node **110*d* (for example, a relay network node) may communicate with the network node 110*a* (for example, a macro network node) and the UE 120*d* in order to facilitate communication between the network node 110*a* and the UE 120*d*. Additionally or alternatively, a UE 120 may be or may operate as a relay station that can relay transmissions to or from other UEs 120. A UE 120** that relays communications may be referred to as a UE relay or a relay UE, among other examples.

In some examples, a relay network node 110 may include an electromagnetic radiation reflective component that can be used to relay (for example, reflect) signals from a first other network node 110 to a second other network node 110 or a UE 120. Such a relay network node 110 can include, for example, a radio frequency reflection array configured to perform radio frequency reflection functions. The electromagnetic radiation reflective array can be, for example, a reconfigurable intelligent surface (RIS) (which also can be referred to as an intelligent reflective surface (IRS)).

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an extended reality (XR) device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 may include or may be included in a housing that houses components associated with the UE 120, such as one or more processor components and/or one or more memory components. One or more of the processor components may be coupled with one or more of the memory components and/or other components. For example, the processor components (for example, one or more processors) and the memory components (for example, one or more memories) may be operatively coupled, communicatively coupled, electronically coupled, or electrically coupled with one another. In some examples, a UE 120 include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs) or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled with one or more of the processors and may individually or collectively store processor-executable code that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains or multiple transceivers, each of which may in turn be coupled with one or more of multiple antennas. In some implementations, one or more processors of the processing system include or implement one or more of the radios, RF chains or transceivers.

Some UEs 120 may be considered machine-type communication (MTC) or evolved or enhanced machine-type communication (eMTC) UEs (or further enhanced eMTC (feMTC), or enhanced feMTC (efeMTC), or further evolutions thereof, all of which may be simply referred to as "MTC"). An MTC UE may be, may include, or may be included in or coupled with a robot, an unmanned aerial vehicle, a remote device, a sensor, a meter, a monitor, and/or a location tag. Some UEs 120 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless communication network 100).

In some examples, two or more UEs 120 (for example, shown as UE 120*a* and UE 120*c*) may communicate directly with one another using sidelink communications (for example, without communicating by way of a network node 110 as an intermediary). As an example, the UE 120*a* may directly transmit data, control information, or other signaling as a sidelink communication to the UE 120*e*. This is in contrast to, for example, the UE 120*a* first transmitting data in an UL communication to a network node 110, which then transmits the data to the UE 120*e* in a DL communication. In various examples, the UEs 120 may communicate using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a network node 110 may schedule and/or allocate resources for sidelink communications between UEs 120 in the wireless communication network 100. In some other deployments and configurations, a UE 120 (instead of a network node 110) may perform, or collaborate or negotiate with one or more other UEs to perform, scheduling operations, resource selection operations, and/or other operations for sidelink communications.

Downlink and uplink resources may include time domain resources (frames, subframes, slots, and/or symbols), frequency domain resources (frequency bands, frequency carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a downlink control information (DCI) configuration to the one or more UEs 120) and/or reconfigured, which means that a BWP can be adjusted in real-time (or near-real-time) based on changing network conditions in the wireless communication network 100 and/or based on the specific requirements of the one or more UEs 120. This enables more efficient use of the available frequency domain resources in the wireless communication network 100 because fewer frequency domain resources may be allocated to a BWP for a UE 120 (which may reduce the quantity of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

As indicated above, a BWP may be configured as a subset or a part of a total or full component carrier bandwidth and generally forms or encompasses a set of contiguous common resource blocks (CRBs) within the full component carrier bandwidth. In other words, within the carrier bandwidth, a BWP starts at a CRB and may span a set of consecutive CRBs. Each BWP may be associated with its own numerology (indicating a sub-carrier spacing (SCS) and cyclic prefix (CP)). A UE 120 may be configured with up to four downlink BWPs and up to four uplink BWPs for each serving cell. To enable reasonable UE battery consumption, only one BWP in the downlink and one BWP in the uplink are generally active at a given time on an active serving cell under typical operation. The active BWP defines the operating bandwidth of the UE 120 within the operating bandwidth of the serving cell while all other BWPs with which the UE 120 is configured are deactivated. On deactivated BWPs, the UE 120 does not transmit or receive any communications.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move according to the location of an associated mobile network node 110 (for example, a train, a satellite base station, an unmanned aerial vehicle, or a non-terrestrial network (NTN) network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110*a* may be a macro network node for a macro cell 130*a*, the network node 110*b* may be a pico network node for a pico cell 130*b*, and the network node 110*c* may be a femto network node for a femto cell 130*c*. Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless networks 100 may be deployed in a given geographic area. Each wireless communication network 100 may support a particular RAT (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHZ), FR2 (24.25 GHz through 52.6 GHZ), FR3 (7.125 GHZ through 24.25 GHZ), FR4a or FR4-1 (52.6 GHz through 71 GHZ), FR4 (52.6 GHZ through 114.25 GHZ), and FR5 (114.25 GHz through 300 GHz). Although a portion of FR1 is greater than 6 GHz, FR1 is often referred to (interchangeably) as a "Sub-6 GHz" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHZ," if used herein, may broadly refer to frequencies that are less than 6 GHZ, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHZ. For example, each of FR4a, FR4-1, FR4, and FR5 falls within the EHF band. In some examples, the wireless communication network 100 may implement dynamic spectrum sharing (DSS), in which multiple RATs (for example, 4G/LTE and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

In some aspects, the UE 120 may include a communication manager 140. As described in more detail elsewhere herein, the communication manager 140 may receive, from an assisting node, assistance information that relates to a Tx/Rx mismatch associated with the UE 120; obtain one or more Tx/Rx imbalance values associated with the UE 120 in accordance with the assistance information received from the assisting node; estimate an effective uplink channel in accordance with a downlink channel estimate associated with a downlink reference signal and in accordance with the one or more Tx/Rx imbalance values associated with the UE 120; and transmit an uplink communication using a precoder associated with the estimated effective uplink channel. Additionally, or alternatively, the communication manager 140 may perform one or more other operations described herein.

Figure 2:
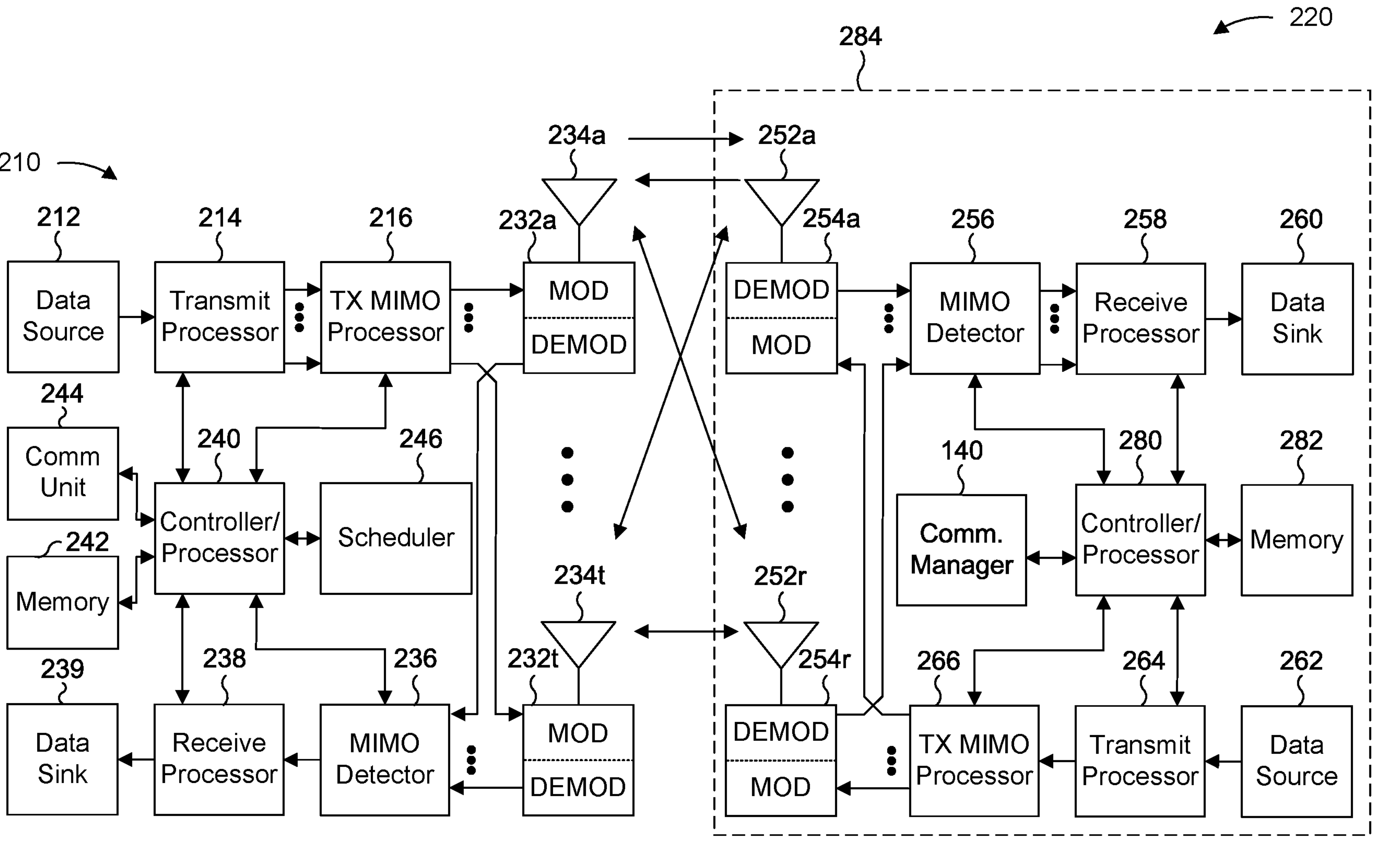
FIG. 2 is a diagram illustrating an example network node in communication with a user equipment (UE) in a wireless network in accordance with the present disclosure.

FIG. 2 is a diagram illustrating an example network node 210 in communication with an example UE 220 in a wireless network in accordance with the present disclosure. The network node 210 of FIG. 2 may be an example of the network node 110 described with reference to FIG. 1. Similarly, the UE 220 may be an example of the UE 120 described with reference to FIG. 1.

As shown in FIG. 2, the network node 210 may include a data source 212, a transmit processor 214, a transmit (TX) multiple-input multiple-output (MIMO) processor 216, a set of modems 232 (shown as 232*a* through 232*t*, where t≥1), a set of antennas 234 (shown as 234*a* through 234*v*, where v≥1), a MIMO detector 236, a receive processor 238, a data sink 239, a controller/processor 240, a memory 242, a communication unit 244, a scheduler 246, and/or a communication manager among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 210. The transceiver may be under control of and used by a processor, such as the controller/processor 240, and in some aspects in conjunction with processor-readable code stored in the memory 242, to perform aspects of the methods, processes, and/or operations described herein. In some aspects, the network node 210 may include one or more interfaces, communication components, and/or other components that facilitate communication with the UE 220 or another network node.

The terms "processor," "controller," or "controller/processor" may refer to one or more controllers and/or one or more processors. For example, reference to "a/the processor" or "a/the controller/processor" (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 210 may include transmit processor 214, TX MIMO processor 216, MIMO detector 236, receive processor 238, and/or controller/processor 240. Similarly, one or more processors of the UE 220 may include MIMO detector 256, receive processor 258, transmit processor 264, TX MIMO processor 266, and/or controller/processor 280. As used herein, "processor," "controller," or "controller/processor" can refer to a general purpose processor, a digital signal processor (DSP), an application-specific integrated circuit (ASIC), a field programmable gate array (FPGA) or other programmable logic device (PLD), discrete gate or transistor logic, discrete hardware components, or any combination thereof. A general purpose processor may be a microprocessor or any commercially available processor, controller, microcontroller, or state machine. A processor may also be implemented as a combination of computing devices (for example, a combination of a DSP and a microprocessor, a plurality of microprocessors, one or more microprocessors in conjunction with a DSP core, a system on a chip (SoC), or any other such configuration).

In some aspects, a single processor may perform all of the operations described as being performed by the one or more processors. In some aspects, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

For downlink communication from the network node 210 to the UE 220, the transmit processor 214 may receive data ("downlink data") intended for the UE 220 (or a set of UEs that includes the UE 220) from the data source 212 (such as a data pipeline or a data queue). In some examples, the transmit processor 214 may select one or more MCSs for the UE 220 in accordance with one or more channel quality indicators (CQIs) received from the UE 220. The network node 210 may process the data (for example, including encoding the data) for transmission to the UE 220 on a downlink in accordance with the MCS(s) selected for the UE 220 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing ((OFDM)) to obtain an output sample stream. Each modem 232 may further use the respective modulator component to process (for example, convert to analog, amplify, filter, and/or upconvert) the output sample stream to obtain a time domain downlink signal. The modems 232*a* through 232*t* may together transmit a set of downlink signals (for example, T downlink signals) via the corresponding set of antennas 234.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 100. A data stream (for example, from the data source 212) may be encoded into multiple TBs for transmission over the air interface. The quantity of TBs used to carry the data associated with a particular data stream may be associated with a TB size common to the multiple TBs. The TB size may be based on or otherwise associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 220 to the network node 210, uplink signals from the UE 220 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 210 may use the scheduler 246 to schedule one or more UEs 220 for downlink or uplink communications. In some aspects, the scheduler 246 may use DCI to dynamically schedule DL transmissions to the UE 220 and/or UL transmissions from the UE 220. In some examples, the scheduler 246 may allocate recurring time domain resources and/or frequency domain resources that the UE 220 may use to transmit and/or receive communications using an RRC configuration (for example, a semi-static configuration), for example, to perform semi-persistent scheduling (SPS) or to configure a configured grant (CG) for the UE 220.

One or more of the transmit processor 214, the TX MIMO processor 216, the modem 232, the antenna 234, the MIMO detector 236, the receive processor 238, and/or the controller/processor 240 may be included in an RF chain of the network node 210. An RF chain may include filters, mixers, oscillators, amplifiers, analog-to-digital converters (ADCs), and/or other devices that convert between an analog signal (such as for transmission or reception via an air interface) and a digital signal (such as for processing by one or more processors of the network node 210). In some aspects, the RF chain may be or may be included in a transceiver of the network node 210.

In some examples, the network node 210 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 210 may use the communication unit 244 to transmit and/or receive data associated with the UE 220 or to perform network control signaling, among other examples. The communication unit 244 may include a transceiver and/or an interface, such as a network interface.

The UE 220 may include a set of antennas 252 (shown as antennas 252*a* through 252*r*, where r≥1), a set of modems 254 (shown as modems 254*a* through 254*u*, where u≥1), a MIMO detector 256, a receive processor 258, a data sink 260, a data source 262, a transmit processor 264, a TX MIMO processor 266, a controller/processor 280, and/or a memory 282, among other examples. One or more of the components of the UE 220 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 220. The transceiver may be under control of and used by a processor, such as the controller/processor 280, and in some aspects in conjunction with processor-readable code stored in the memory 282, to perform aspects of the methods, processes, or operations described herein. In some aspects, the UE 220 may include another interface, another communication component, and/or another component that facilitates communication with the network node 210 and/or another UE 220.

For downlink communication from the network node 210 to the UE 220, the set of antennas 252 may receive the downlink communications or signals from the network node 210 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 220 to the data sink 260 (such as a data pipeline, a data queue, and/or an application executed on the UE 220), and may provide decoded control information and system information to the controller/processor 280.

For uplink communication from the UE 220 to the network node 210, the transmit processor 264 may receive and process data ("uplink data") from a data source 262 (such as a data pipeline, a data queue, and/or an application executed on the UE 220) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 210 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 220 by the network node 210.

The transmit processor 264 may generate reference symbols for one or more reference signals, such as an uplink DMRS, an uplink sounding reference signal (SRS), and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, R output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254*a* through 254*r* may transmit a set of uplink signals (for example, R uplink signals) via the corresponding set of antennas 252. An uplink signal may include an uplink control information (UCI) communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 220) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. The term "beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 220 or network nodes 110 may include different numbers of antenna elements. For example, a UE 220 may include a single antenna element, two antenna elements, four antenna elements, eight antenna elements, or a different number of antenna elements. As another example, a network node 210 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

The network node 210 may provide the UE 220 with a configuration of transmission configuration indicator (TCI) states that indicate or correspond to beams that may be used by the UE 220, such as for receiving one or more communications via a physical channel. For example, the network node 210 may indicate (for example, using DCI) an activated TCI state to the UE 220, which the UE 220 may use to generate a beam for receiving one or more communications via the physical channel. A beam indication may be, or may include, a TCI state information element, a beam identifier (ID), spatial relation information, a TCI state ID, a closed loop index, a panel ID, a TRP ID, and/or an SRS set ID, among other examples. A TCI state information element (sometimes referred to as a TCI state herein) may indicate particular information associated with a beam. For example, the TCI state information element may indicate a TCI state identification (for example, a tci-StateID), a quasi-co-location (QCL) type (for example, a qcl-Type1, qcl-Type2, qcl-TypeA, qcl-TypeB, qcl-TypeC, or a qcl-TypeD, among other examples), a cell identification (for example, a ServCellIndex), a bandwidth part identification (bwp-Id), or a reference signal identification, such as a CSI-RS identification (for example, an NZP-CSI-RS-ResourceId or an SSB-Index, among other examples). Spatial relation information may similarly indicate information associated with an uplink beam. The beam indication may be a joint or separate DL/UL beam indication in a unified TCI framework. In a unified TCI framework, the network may support common TCI state ID update and activation, which may provide common QCL and/or common UL transmission spatial filters across a set of configured component carriers. This type of beam indication may apply to intra-band CA, as well as to joint DL/UL and separate DL/UL beam indications. The common TCI state ID may imply that one reference signal determined according to the TCI state(s) indicated by a common TCI state ID is used to provide QCL Type-D indication and to determine UL transmission spatial filters across the set of configured CCs.

In some examples, the network may support a layer 1 (L1)-based beam indication using at least UE-specific (unicast) DCI to indicate joint or separate DL/UL beam indications that may be selected from active TCI states. In some examples, DCI formats 1_1 and/or 1_2 may be used for beam indication. The network node 210 may include a support mechanism for the UE 220 to acknowledge successful decoding of a beam indication. For example, the acknowledgment/negative acknowledgment of the PDSCH scheduled by the DCI carrying the beam indication may also be used as an acknowledgement for the DCI.

Further efficiencies in throughput, signal strength, and/or other signal properties may be achieved through beam refinement. For example, the network node 210 may be capable of communicating with the UE 220 using beams of various beam widths. For example, the network node 210 may be configured to utilize a wider beam to communicate with the UE 220 when the UE 220 is in motion because wider coverage may increase the likelihood that the UE 220 remains in coverage of the network node 210 while moving. Conversely, the network node 210 may use a narrower beam to communicate with the UE 220 when the UE 220 is stationary because the network node 210 can reliably focus coverage on the UE 220 with low or minimal likelihood of the UE 220 moving out of the coverage area of the network node 210. In some examples, to select a particular beam for communication with a UE 220, the network node 210 may transmit a reference signal, such as a synchronization signal block (SSB) or a CSI-RS, on each of a plurality of beams in a beam-sweeping manner. In some examples, SSBs may be transmitted on wider beams, whereas CSI-RSs may be transmitted on narrower beams. The UE 220 may measure the RSRP or the signal-to-interference-plus-noise ratio (SINR) on each of the beams and transmit a beam measurement report (for example, an L1 measurement report) to the network node 210 indicating the RSRP or SINR associated with each of one or more of the measured beams. The network node 210 may then select the particular beam for communication with the UE 220 based on the L1 measurement report. In some other examples, when there is channel reciprocity between the uplink and the downlink, the network node 210 may derive the particular beam to communicate with the UE 220 (for example, on both the uplink and downlink) based on uplink measurements of one or more uplink reference signals, such as an SRS, transmitted by the UE 220.

One enhancement for multi-beam operation at higher carrier frequencies is facilitation of efficient (for example, low latency and low overhead) downlink and/or uplink beam management operations to support higher Layer 1 and/or Layer 2 (L1/L2)-centric inter-cell mobility. L1 and/or L2 signaling may be referred to as "lower layer" signaling and may be used to activate and/or deactivate candidate cells in a set of cells configured for L1/L2 mobility and/or to provide reference signals for measurement by the UE 220, by which the UE 220 may select a candidate beam as a target beam for a lower layer handover operation. Accordingly, one goal for L1/L2-centric inter-cell mobility is to enable a UE to perform a cell switch via dynamic control signaling at lower layers (for example, DCI for L1 signaling or a MAC-CE for L2 signaling), rather than semi-static Layer 3 (L3) RRC signaling, in order to reduce latency, reduce overhead, and/or otherwise increase efficiency of the cell switch.

In some examples, for a UE 220, UL transmission may be performed using one antenna panel, and DL reception may be performed using another antenna panel. In some examples, full-duplex communication may be conditional on a beam separation of the UL beam and DL beam at respective antenna panels. Utilizing full-duplex communication may provide a reduction in latency, such that it may be possible to receive a DL signal in UL-only slots, which may enable latency savings. In addition, full-duplex communication may enhance spectrum efficiency per cell or per UE 220, and may enable more efficient utilization of resources. Beam separation of the UL and DL beams assists in limiting or reducing self-interference that may occur during full duplex communication. UL and DL beams that are separated on their respective antenna panels may provide reliable full duplex communication by minimizing or reducing self-interference.

A full-duplex UE 220 may perform a self-interference measurement (SIM) procedure to identify self-interference from transmissions of the full-duplex UE 220. A full-duplex network node 210 also may perform a SIM procedure to identify self-interference from transmissions of the full-duplex network node 210. The UE 220 may provide a measurement report to the network node 210 to indicate results of the UE SIM. The network node 210 may select pairs of beams (referred to herein as "beam pairs") for the UE 220 ("UE beam pairs") and the network node 210 ("network node beam pairs") to use during full-duplex communications. A beam pair generally includes a receive (Rx) beam and a transmit (Tx) beam, such as a DL beam and an UL beam, respectively, for the UE 220, and similarly, an UL beam and a DL beam, respectively, for the network node 210.

The network node 110, the controller/processor 240 of the network node 210, the UE 120, the controller/processor 280 of the UE 220, or any other component(s) of FIG. 1 or 2 may implement one or more techniques or perform one or more operations associated with UE Tx/Rx calibration in TDD using assistance information, as described in more detail elsewhere herein. For example, the controller/processor 240 of the network node 210, the controller/processor 280 of the UE 220, any other component(s) of FIG. 2 may perform or direct operations of, for example, process 500 of FIG. 5 or other processes as described herein (alone or in conjunction with one or more other processors). The memory 242 may store data and program codes for the network node 110 or the network node 210. The memory 282 may store data and program codes for the UE 120 or the UE 220. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 210 or the UE 220 may cause the one or more processors to perform process 500 of FIG. 5 or other processes as described herein. In some examples, executing instructions may include running the instructions, converting the instructions, compiling the instructions, and/or interpreting the instructions, among other examples.

In some aspects, the UE 120 includes means for receiving, from an assisting node, assistance information that relates to a Tx/Rx mismatch associated with the UE 120; means for obtaining one or more Tx/Rx imbalance values associated with the UE 120 in accordance with the assistance information received from the assisting node; means for estimating an effective uplink channel in accordance with a downlink channel estimate associated with a downlink reference signal and in accordance with the one or more Tx/Rx imbalance values associated with the UE 120; and/or means for transmitting an uplink communication using a precoder associated with the estimated effective uplink channel. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

Figure 3A:
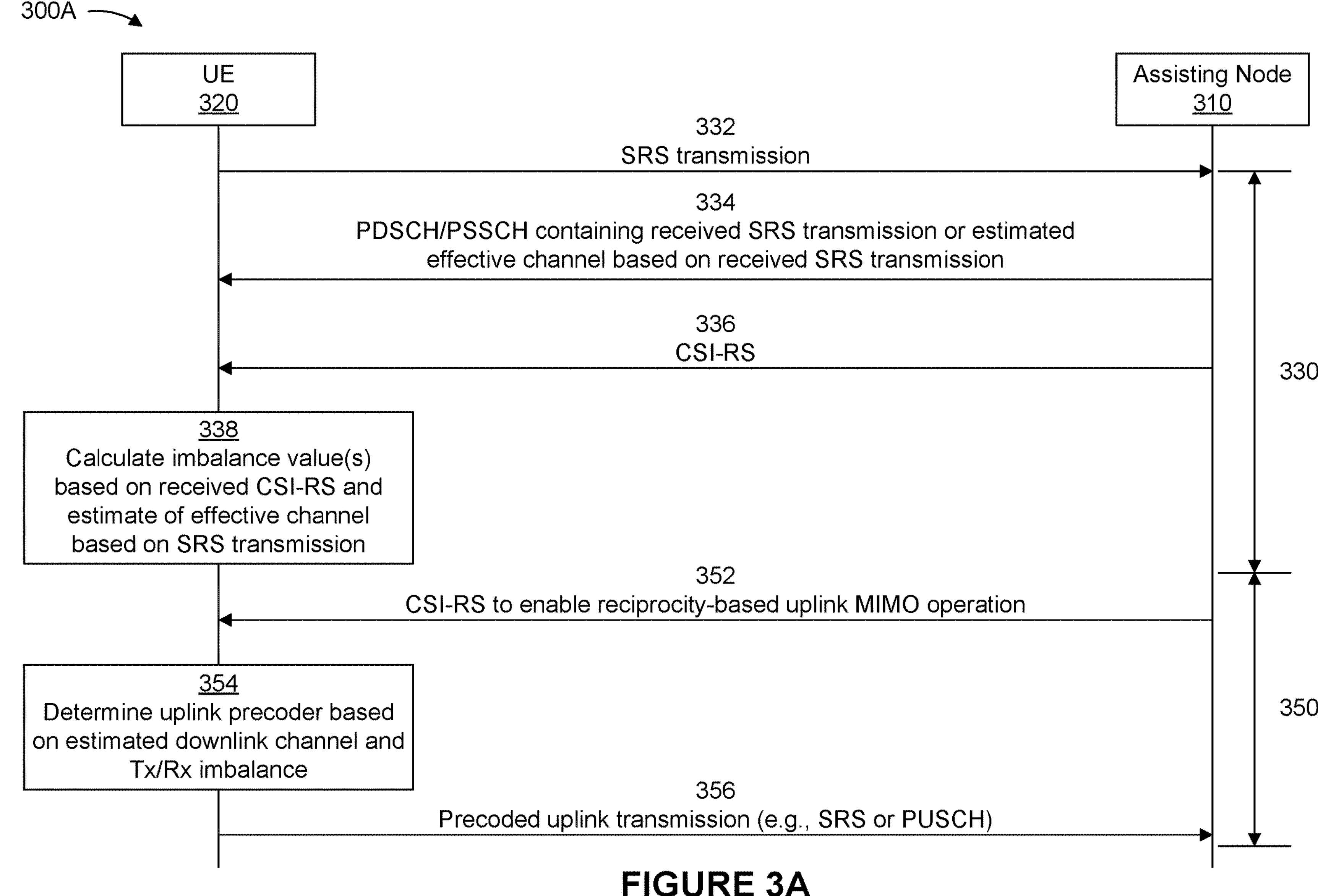
FIGS. 3A-3B are diagrams illustrating examples associated with UE transmit/receive (Tx/Rx) calibration in time division duplexing (TDD) using assistance information in accordance with the present disclosure.
Figure 3B:
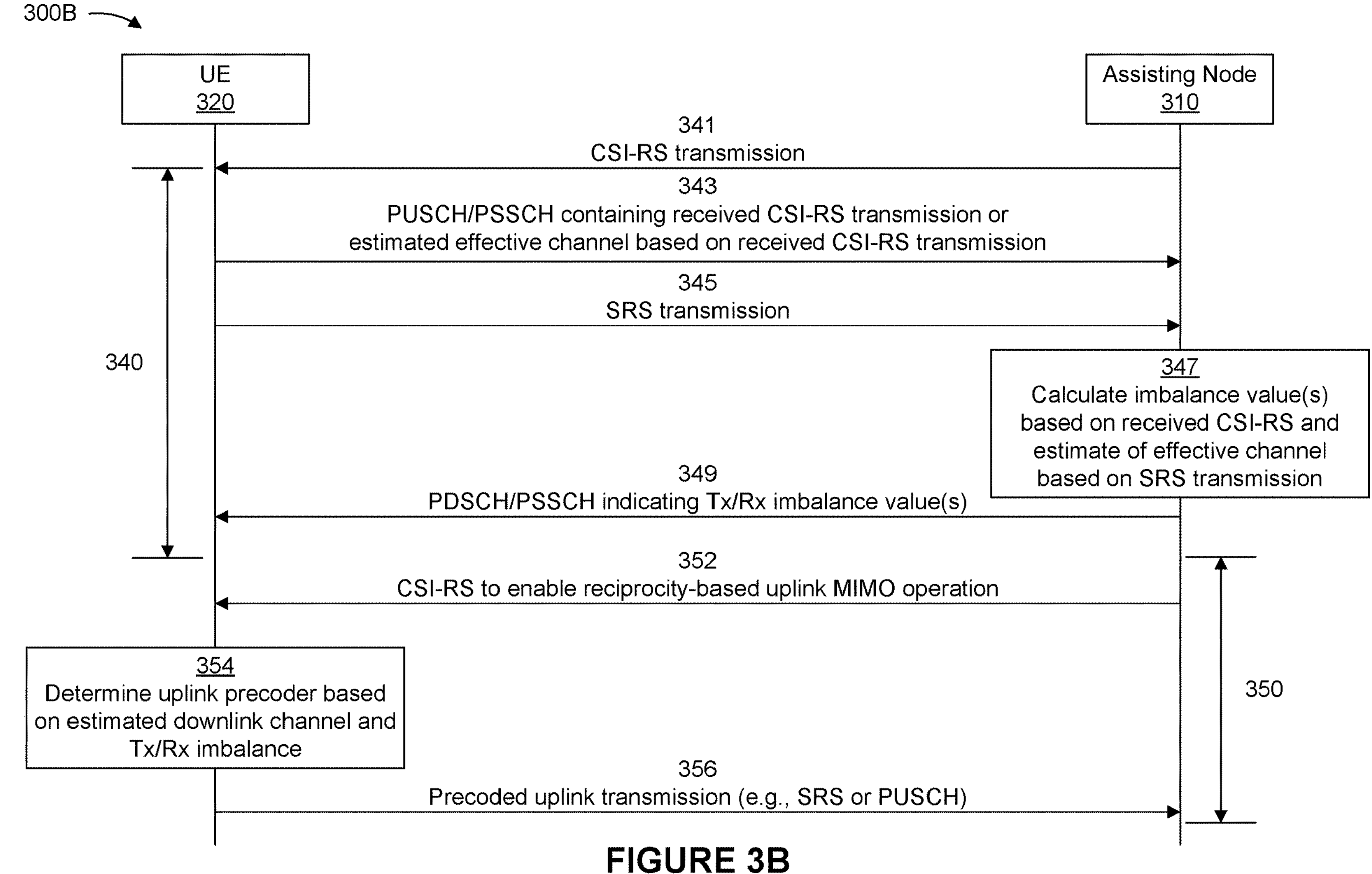

FIGS. 3A-3B are diagrams illustrating examples 300A, 300B associated with UE Tx/Rx calibration in a TDD system using assistance information in accordance with the present disclosure. As shown in FIGS. 3A-3B, examples 300A, 300B include communication between an assisting node 310 and a UE 320. In some aspects, the assisting node 310 and the UE 320 may be included in a wireless network, such as wireless communication network 100. In some aspects, the assisting node 310 may be a network node that communicates with the UE 320 via a wireless access link, which may include an uplink and a downlink. Additionally or alternatively, the assisting node 310 may be a UE that communicates with the UE 320 via a wireless sidelink.

As described herein, in a TDD system, channel reciprocity generally refers to the property of a wireless (over-the-air) communication channel in which uplink and downlink channels experience similar propagation characteristics in both communication directions. For example, channel conditions that are observed in an uplink direction (from a UE to a network node) are highly correlated with channel conditions that are observed in a downlink direction (from the network node to the UE) due to the uplink and downlink channels sharing a physical medium and propagation environment. For example, in a TDD system, a downlink channel may be denoted $H_{DL}$, an uplink channel may be denoted $H_{UL}$, and the channel reciprocity property provides that $$H_{DL} = H_{UL}^T,$$

where $H_{DL} \in C^{N \times M}$ and $H_{UL} \in C^{M \times N}$, where M is the number of antennas at the network node and N is the number of antennas at the UE.

Channel reciprocity has an important role in increasing the efficient use of resources in a TDD system, because channel estimation and equalization can be performed in a downlink direction using information received in an uplink transmission (and vice versa), and such information can then be used to optimize transmission in the downlink direction (and vice versa). For example, the channel reciprocity property can be used to enable reciprocity-based beamforming and/or precoding in a TDD-based MIMO system. For example, in a downlink direction, a network node may receive an SRS from a UE, which may be used to obtain $H_{UL}$. Assuming that the uplink and downlink channels are reciprocal $$(H_{DL} = H_{UL}^T),$$

the network node can then obtain a precoding for one or more downlink transmissions (for example, a PDSCH transmission or a CSI-RS transmission) based on $H_{UL}$. Similarly, in an uplink direction, the UE may receive a CSI-RS from the network node, which the UE may use to obtain $H_{DL}$. Assuming that the uplink and downlink channels are reciprocal $$(H_{UL} = H_{DL}^T),$$

the UE can then obtain a precoding for one or more uplink transmissions (for example, a PUSCH transmission or an SRS transmission) based on $H_{DL}$. Furthermore, channel reciprocity may be similarly applied to TDD-based sidelink communication between UEs.

In practice, however, each node that communicates over a wireless channel in a TDD system (for example, a network node and a UE, or a first UE and a second UE) introduces a transmit/receive (Tx/Rx) mismatch, such as an amplitude and phase perturbation, to the signals that are transmitted and received over the wireless channel. As a result, despite the fact that the propagation channels are reciprocal, components included in transceiver RF chains (for example, power amplifiers, low noise amplifiers, and/or RF mixers and filters, among other examples) are often not identical across Tx and Rx branches. The difference between the components in the Tx and Rx branches creates a difference between Tx and Rx responses, or a Tx/Rx mismatch, whereby effective downlink and uplink channels between any two given antennas may not be reciprocal.

For example, in cases where there is a Tx/Rx mismatch at a network node or a UE, the Tx/Rx mismatch may be represented as $\Phi_{UR}H_{DL}\Phi_{BT} \neq (\Phi_{BR}H_{UL}\Phi_{UT})^T$, where $\Phi_{UR}H_{DL}\Phi_{BT}$ represents the effective downlink channel and $(\Phi_{BR}H_{UL}\Phi_{UT})$ represents the effective uplink channel. In this case, a Tx/Rx mismatch at the network node is represented by the expression $\Phi_{BT} \neq \Phi_{BR}$, where $\phi_{BT,i}$ represents a Tx chain imbalance at the network node, which includes a gain and/or phase imbalance at the Tx chain of the network node and an error in transmit power and $\Phi_{BT}$ is a diagonal matrix for M Tx antennas at the network node. Furthermore, the term $\phi_{BR,i}$ represents an Rx chain imbalance at the network node, which includes a gain and/or phase imbalance at the Rx chain of the network node and a gain and/or phase error in automatic gain control (AGC), $\Phi_{BR}$ is a diagonal matrix for M Rx antennas at the network node, and the Tx/RX imbalance at the network node is represented by the expression $$\Phi_B = \Phi_{BT}\Phi_{BR}^{-1}.$$

In a similar respect, a Tx/Rx mismatch at the UE is represented by the expression $\Phi_{UT} \neq \Phi_{UR}$, where $\phi_{UT,j}$ represents a Tx chain imbalance at the UE, which includes a gain and/or phase imbalance at the Tx chain of the UE and an error in transmit power and $\Phi_{UT}$ is a diagonal matrix for N Tx antennas at the UE. Furthermore, the term $\phi_{UR,j}$ represents an Rx chain imbalance at the UE, which includes a gain and/or phase imbalance at the Rx chain of the UE and a gain and/or phase error in AGC, $\Phi_{UR}$ is a diagonal matrix for N Rx antennas at the UE, and the Tx/RX imbalance at the UE node is represented by the expression $$\Phi_U = \Phi_{UT}\Phi_{UR}^{-1}.$$

Accordingly, in some cases, there may be a need to perform Tx/Rx calibration in a TDD system. For example, Tx/Rx calibration may include techniques to measure an effective imbalance between Tx and Rx antennas and compensate for the effective imbalance when selecting or configuring a precoder. In other words, Tx/Rx calibration techniques can be used to make effective downlink and uplink channels (or transmission and reception channels) reciprocal in a TDD system, which allows a transmitter (for example, a network node for downlink, or a UE for uplink or sidelink) to obtain the channel based on a received reference signal and derive the precoding based on the obtained channel. However, Tx/Rx calibration is typically needed only at the transmitter (where the precoding is applied), and may be unnecessary the receiver side. For example, in a downlink direction, where a network node is transmitting a PDSCH or a CSI-RS to a UE with a precoding that is based on an SRS received from the UE, Tx/Rx calibration is relevant only at the network node. In such cases, the network node may multiply a received version of the SRS by the imbalance matrix, $$\Phi_B = \Phi_{BT}\Phi_{BR}^{-1},$$

from which the network node can obtain the downlink channel and the appropriate downlink precoder. Similarly, in an uplink direction, where a UE is transmitting a PUSCH or an SRS with a precoding that is based on an CSI-RS received from a network node, Tx/Rx calibration is relevant only at the UE. In such cases, the UE may multiply a received version of the CSI-RS by the imbalance matrix, $$\Phi_U = \Phi_{UT}\Phi_{UR}^{-1},$$

from which the UE can obtain the uplink channel and the appropriate uplink precoder.

In some cases, a network node may have a capability to perform self-calibration using additional hardware, such as an extra antenna that a network node uses to calibrate an antenna array. Additionally or alternatively, the network node may perform over-the-air calibration, where one or more assisting nodes (for example, other network nodes or UEs) provide assistance information that the network node can use to obtain one or more Tx/Rx imbalance values (for example, the imbalance matrix $$\Phi_B = \Phi_{BT}\Phi_{BR}^{-1}).$$

However, self-calibration is difficult or impractical for a UE due to the need for additional hardware. Furthermore, wireless networks currently lack support for over-the-air techniques to perform Tx/Rx calibration at a UE.

Accordingly, some aspects described herein relate generally to over-the-air techniques for performing Tx/Rx calibration at the UE 320 using assistance information provided by the assisting node 310 (for example, a network node that communicates with the UE 320 over an access link or a nearby UE that communicates with the UE 320 over a sidelink). Some aspects more specifically relate to techniques that may enable a UE to obtain one or more Tx/Rx imbalance values. For example, in some aspects, the over-the-air techniques described herein may enable the UE 320 to obtain a Tx/Rx imbalance matrix that contains the one or more Tx/Rx imbalance values. Additionally or alternatively, a dimension of the Tx/Rx imbalance matrix (or the number of values included in the Tx/Rx imbalance matrix) may correspond to the number of antennas at the UE 320, and each Tx/Rx imbalance value may be a complex value that includes a gain imbalance component and a phase imbalance component. For example, in FIG. 3A, example 300A depicts a first approach that includes a Tx/Rx mismatch calibration phase 330 in which the UE 320 calculates the Tx/RX imbalance matrix $$\Phi_U = \Phi_{UT}\Phi_{UR}^{-1}$$

using assistance information provided by the assisting node 310. Alternatively, in FIG. 3B, example 300B depicts a second approach that includes a Tx/Rx mismatch calibration phase 340 in which the assisting node 310 calculates the Tx/RX imbalance matrix $$\Phi_U = \Phi_{UT}\Phi_{UR}^{-1},$$

whereby the assistance information provided by the assisting node 310 to the UE 320 indicates the Tx/RX imbalance matrix $$\Phi_U = \Phi_{UT}\Phi_{UR}^{-1}.$$

In either approach, the Tx/Rx calibration phase 330/340 is followed by a reciprocity-based MIMO operation 350.

More particularly, referring to FIG. 3A, the Tx/Rx calibration phase 330 includes a first operation 332 in which the UE 320 transmits a reference signal, such as an SRS, to the assisting node 310. The SRS may be received by the assisting node 310, and may be represented as $Y=\Phi_{BR}H_{UL}\Phi_{UT}+N$, where $\Phi_{BR}$ is a receive-side mismatch at the assisting node 310, $H_{UL}$ is the uplink (or sidelink) channel over which the SRS is transmitted, $\Phi_{UT}$ is a transmit-side mismatch at the UE 320, and N is additive noise. As further shown in FIG. 3A, the Tx/Rx calibration phase 330 includes a second operation 334 in which the assisting node 310 transmits assistance information back to the UE 320, where the assistance information may include the received version of the SRS, Y, or an estimate of the effective uplink channel, $\Phi_{BR}H_{UL}\Phi_{UT}$, which may be carried in a PDSCH transmission in cases where the assisting node 310 is a network node or a PSSCH transmission in cases where the assisting node 310 is UE. In some aspects, the assistance information may be included in a MAC-CE or a protocol data unit (PDU) that has a header to indicate that the payload of the MAC-CE or PDU carries the assistance information indicating the received version of the SRS or the estimated effective uplink channel. As further shown in FIG. 3A, the Tx/Rx calibration phase 330 includes a third operation 336 in which the assisting node 310 transmits a reference signal, such as a CSI-RS, to the UE 320, which enables the UE 320 to estimate the effective downlink channel. For example, the CSI-RS may be received by the UE 320, and may be represented as $Z=\Phi_{UR}H_{DL}\Phi_{BT}+N$, where $\Phi_{UR}$ is a receive-side mismatch at the UE 320, $H_{DL}$ is the downlink (or sidelink) channel over which the CSI-RS is transmitted, @BT is a transmit-side mismatch at the assisting node 310, and N is additive noise. At this point, the UE 320 has access to both the estimate of the effective uplink channel (or transmission channel) and the effective downlink channel (or reception channel). Accordingly, in a fourth operation 338, the UE 320 can calculate the imbalance matrix $$\Phi_U = \Phi_{UT}\Phi_{UR}^{-1}$$

based on the received version of the CSI-RS, Z, and the effective uplink channel that is indicated in the assistance information provided by the assisting node 310.

Alternatively, referring to FIG. 3B, the Tx/Rx calibration phase 340 includes a first operation 341 in which the assisting node 310 transmits a reference signal, such as a CSI-RS, to the UE 320. The CSI-RS may be received by the UE 320, and may be represented as $Y=\Phi_{UR}H_{DL}\Phi_{BT}+N$, where $\Phi_{UR}$ is a receive-side mismatch at the UE 320, $H_{DL}$ is the downlink (or transmission) channel over which the CSI-RS is transmitted, $\Phi_{BT}$ is a transmit-side mismatch at the assisting node 310, and N is additive noise. As further shown in FIG. 3B, the Tx/Rx calibration phase 340 includes a second operation 343 in which the UE 320 transmits feedback to the assisting node 310, where the feedback may include the received version of the CSI-RS, Y, or an estimate of the effective downlink channel, $\Phi_{UR}H_{DL}\Phi_{BT}$, which may be carried in a PUSCH transmission in cases where the assisting node 310 is a network node or a PSSCH transmission in cases where the assisting node 310 is a UE. In some aspects, the feedback may be included in a MAC-CE or a PDU that has a header to indicate that the payload of the MAC-CE or PDU carries the feedback indicating the received version of the CSI-RS or the estimated effective downlink channel. As further shown in FIG. 3B, the Tx/Rx calibration phase 340 includes a third operation 345 in which the UE 320 transmits a reference signal, such as an SRS, to the assisting node 310, which enables the assisting node 310 to estimate the effective uplink channel. For example, the SRS may be received by the assisting node 310, and may be represented as $Z=\Phi_{BR}H_{UL}\ \Phi_{UT}+N$, where $\Phi_{BR}$ is a receive-side mismatch at the assisting node 310, $H_{UL}$ is the uplink (or sidelink) channel over which the SRS is transmitted, $\Phi_{UT}$ is a transmit-side mismatch at the UE 320, and N is additive noise. At this point, the assisting node 310 has access to both the estimate of the effective uplink channel and the effective downlink channel. Accordingly, in a fourth operation 347, the assisting node 310 can calculate the imbalance matrix $$\Phi_U = \Phi_{UT}\Phi_{UR}^{-1}$$

based on the received version of the SRS, Z, and the effective downlink channel that is indicated in the feedback provided by the UE 320. In a fifth operation 349, the assisting node 310 may then indicate the Tx/Rx imbalance matrix to the UE 320 (for example, in a PDSCH where the assisting node 310 is a network node or a PSSCH transmission where the assisting node 310 is a UE) within a MAC-CE or PDU that has a header to indicate that the payload indicates the Tx/Rx imbalance matrix.

Referring to FIG. 3A and FIG. 3B, the UE 320 may then perform the regular reciprocity-based MIMO operation 350 after obtaining the imbalance matrix, $\Phi_U$. For example, in a first operation 352, the assisting node 310 may transmit a CSI-RS or other reference signal to the UE 320. In a second operation 354, the UE 320 may estimate a downlink channel from the assisting node 310 based on the received reference signal, and may estimate an effective uplink channel to the assisting node 310 based on the estimate of the downlink channel from the received reference signal and the imbalance matrix that was obtained during the Tx/Rx calibration phase 330/340. The UE 320 may then determine a precoding for a transmission (for example, a PUSCH, PSSCH, or SRS) based on the estimate of the downlink channel from the received reference signal and the imbalance matrix that was obtained during the Tx/Rx calibration phase 330/340. As further shown in FIGS. 3A-3B, in a third operation 356, the UE 320 may transmit the signal to the assisting node 310 using the precoding that was selected based on the estimate of the downlink channel from the received reference signal and the imbalance matrix that was obtained during the Tx/Rx calibration phase 330/340.

In some aspects, in addition to calibrating the Tx/Rx mismatch at the UE 320, some aspects described herein can be used to jointly calibrate a Tx/Rx mismatch at the assisting node 310. For example, some aspects may be used to obtain a Tx/Rx imbalance matrix associated with the assisting node 310, $$\Phi_B = \Phi_{BT}\Phi_{BR}^{-1},$$

such that the assisting node 310 can use the Tx/Rx imbalance matrix, $\Phi_B$, for subsequent MIMO transmissions to the UE 320 using a precoding that is based on the reciprocity property (for example, based on an SRS transmission by the UE 320). For example, in cases where the approach shown in FIG. 3A is used to calibrate the Tx/Rx mismatch at the UE 320 (for example, where the UE 320 calculates the Tx/Rx imbalance matrix, $\Phi_U$), the UE 320 may also calculate the Tx/Rx imbalance matrix associated with the assisting node 310, which may be represented as $$\Phi_B = \Phi_{BT}\Phi_{BR}^{-1},$$

and then send the Tx/Rx imbalance matrix associated with the assisting node 310 through a PUSCH transmission (for example, when the assisting node 310 is a network node) or PSSCH transmission (for example, when the assisting node 310 is a UE). In such cases, a MAC-CE or PDU with a known header can be used to indicate the Tx/Rx imbalance matrix associated with the assisting node 310, and the additional calculation of the Tx/Rx imbalance matrix associated with the assisting node 310 may be dependent on a capability of the UE 320 and/or separately configured by the assisting node 310. For example, in some aspects, the assisting node 310 may refrain from configuring the UE 320 to calculate the Tx/Rx imbalance matrix associated with the assisting node 310 in cases where the assisting node 310 supports self-calibration, or may configure the UE 320 to calculate the Tx/Rx imbalance matrix associated with the assisting node 310 less frequently compared to calibrating the Tx/Rx mismatch associated with the UE 320. Additionally or alternatively, in cases where the approach shown in FIG. 3B is used to calibrate the Tx/Rx mismatch at the UE 320 (for example, where the assisting node 310 calculates the Tx/Rx imbalance matrix, $\Phi_U$, and indicates the Tx/Rx imbalance matrix to the UE 320), the assisting node can further calculate the Tx/Rx imbalance matrix associated with the assisting node 310, $$\Phi_B = \Phi_{BT}\Phi_{BR}^{-1},$$

in a manner that is transparent to the UE 320.

Figure 4:
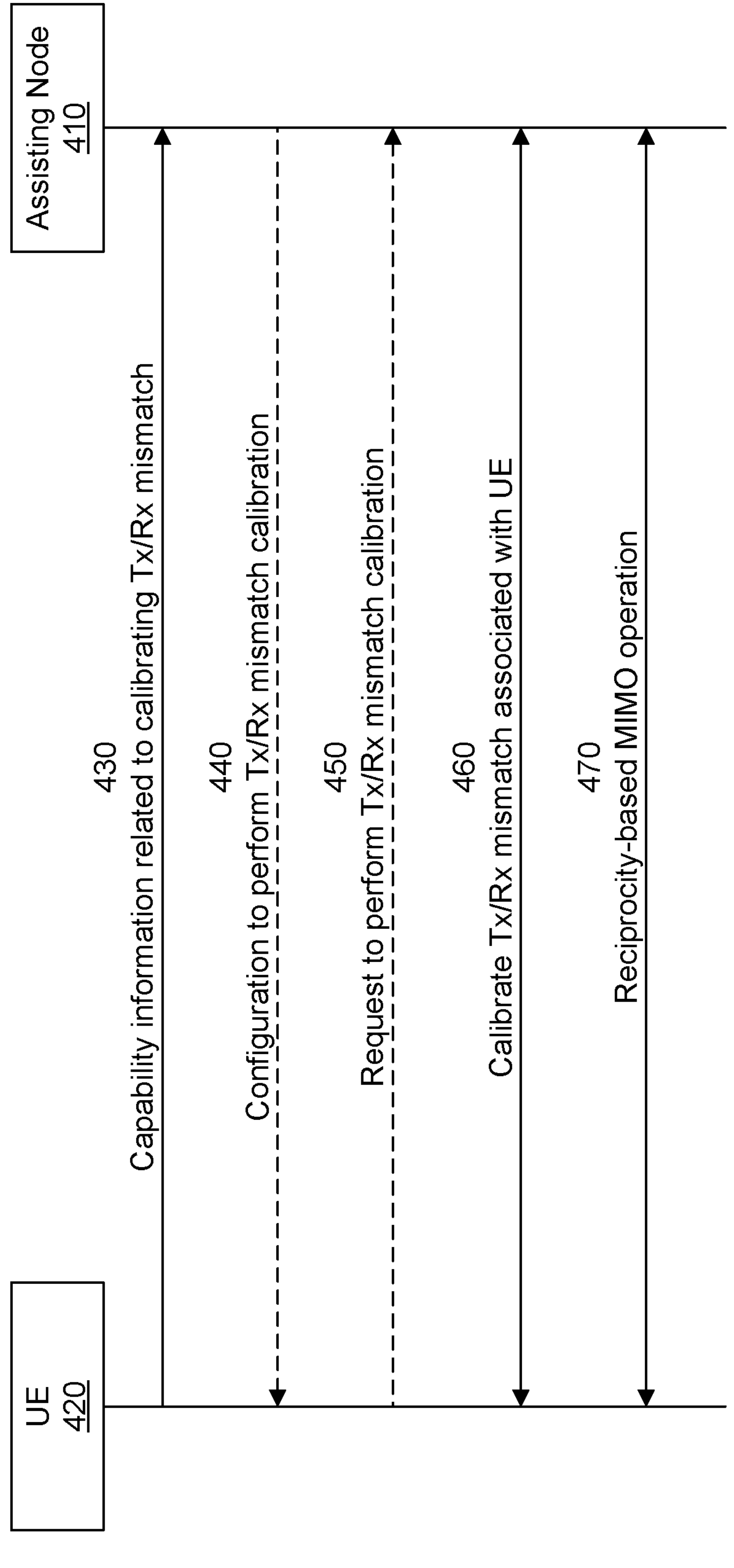
FIG. 4 is a diagram illustrating an example associated with UE Tx/Rx calibration in TDD using assistance information in accordance with the present disclosure.

FIG. 4 is a diagram illustrating an example 400 associated with UE Tx/Rx calibration in a TDD system using assistance information in accordance with the present disclosure. As shown in FIG. 4, example 400 includes communication between an assisting node 410 and a UE 420. In some aspects, the assisting node 410 and the UE 420 may be included in a wireless network, such as wireless communication network 100. In some aspects, the assisting node 410 may be a network node that communicates with the UE 420 via a wireless access link, which may include an uplink and a downlink. Additionally or alternatively, the assisting node 410 may be a UE that communicates with the UE 420 via a wireless sidelink.

As shown in FIG. 4, in a first operation 430, the UE 420 may transmit capability information related to calibrating a Tx/Rx mismatch of the UE 420 to the assisting node 410. For example, as described herein, calibrating the Tx/Rx mismatch of the UE 420 may have a large overhead regardless of whether the Tx/Rx imbalance matrix is calculated by the UE 420 or the assisting node 410, and therefore cannot be done very frequently. However, once the Tx/Rx mismatch of the UE 420 has been calibrated, the Tx/Rx imbalance matrix of the UE 420 can be used to enable reciprocity-based MIMO operation for a relatively long time (for example, anywhere from a few minutes to a few hours, depending on changes in temperature that may change the RF transceiver (Tx/Rx) responses) before needing to be done again. In some cases, how often the UE 420 needs to perform the Tx/Rx mismatch calibration may depend on various factors, including the configurations of the Tx and Rx chains of the UE 420. Accordingly, the UE 420 may transmit the capability information to the assisting node 410 to indicate how often the UE 420 needs to perform the Tx/Rx mismatch calibration. Furthermore, the ability to maintain a relative Tx/Rx imbalance for a duration of time may be an advanced capability that is not universally supported by all UEs. Accordingly, in some aspects, the UE 420 indicate through the capability signaling or through UE assistance information that the UE 420 is capable of performing one or more Tx/Rx mismatch calibration techniques, and is therefore able to maintain a relative Tx/Rx imbalance for a duration of time. In cases where the assisting node 410 supports both Tx/Rx mismatch calibration techniques (for example, as described above with reference to FIGS. 3A-3B), the capability information may further indicate whether the UE 420 supports the first approach, where the UE 420 calculates the Tx/Rx imbalance matrix, the second approach, where the assisting node 410 calculates the Tx/Rx imbalance matrix, or both approaches. Furthermore, in some aspects, the capability information may indicate how frequently to perform the Tx/Rx calibration procedures.

As further shown in FIG. 4, in a second operation 440, the assisting node 410 may configure the UE 420 to perform Tx/Rx calibration through RRC signaling. For example, in cases where the assisting node 410 supports both Tx/Rx mismatch calibration techniques, the RRC configuration may indicate whether the first technique or the second technique, based on the capability of the UE 420 (for example, if the UE 420 only supports the first technique, the RRC configuration may only enable the first technique). Furthermore, in some aspects, the RRC configuration may semi-statically configure the CSI-RS and/or SRS that are used for Tx/Rx mismatch calibration, or the CSI-RS and/or SRS that are used for Tx/Rx mismatch calibration may be triggered dynamically (for example, using Layer 1 (L1) signaling, such as DCI, or Layer 2 (L2) signaling, such as a MAC-CE). Furthermore, the CSI-RS used for Tx/Rx mismatch calibration may be configured with a specific usage (for example, "Tx/Rx calibration") so that the UE 420 is configured to use the received signal for Tx/Rx calibration. Additionally or alternatively, in a third operation 450, the UE 420 may dynamically indicate (using L1/L2 signaling) a request to perform Tx/Rx calibration for the UE 420 by sending UCI on a PUCCH or PUSCH or by sending a MAC-CE on a PUSCH. As shown in FIG. 4, in a fourth operation 460, the UE 420 and the assisting node 410 may communicate to perform the Tx/Rx mismatch calibration (for example, based on the RRC configuration or the dynamic request), which may be performed using one or more of the techniques described above with reference to FIGS. 3A-3B. In a fifth operation 470, the assisting node 410 and the UE 420 may perform reciprocity-based MIMO operation, where the UE 420 uses the Tx/Rx imbalance matrix of the UE 420 and a channel estimate associated with a reference signal received from the assisting node 410 to select a precoder to apply to a transmission to the assisting node 410.

Figure 5:
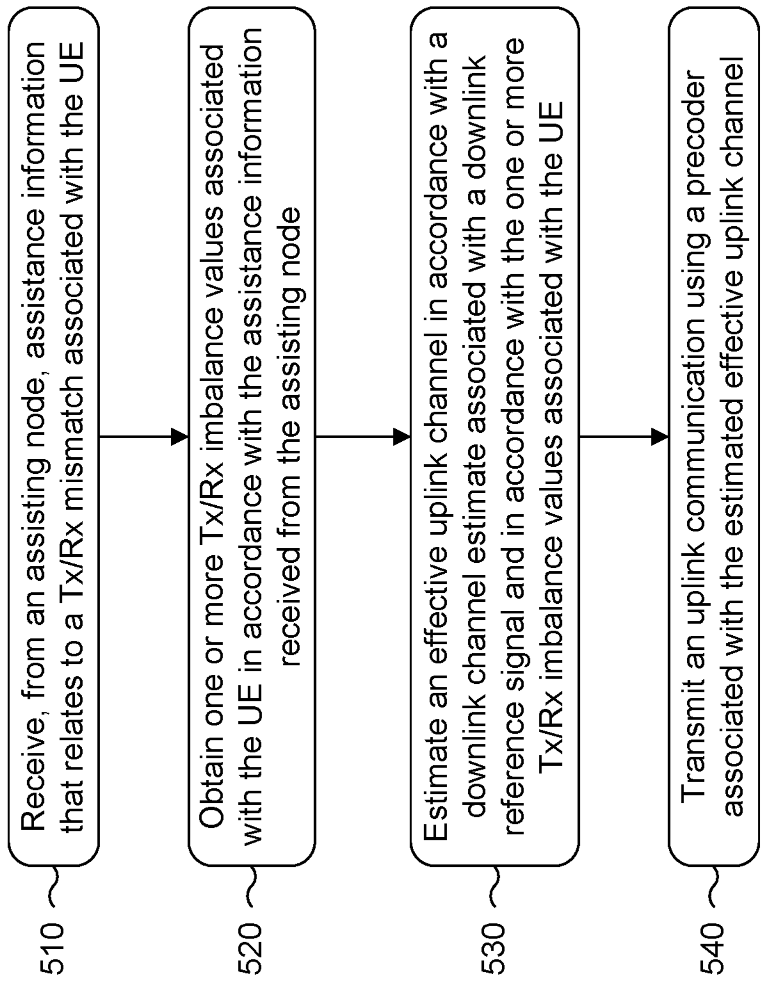
FIG. 5 is a flowchart illustrating an example process performed, for example, by a UE in accordance with the present disclosure.

FIG. 5 is a flowchart illustrating an example process 500 performed, for example, at a UE or an apparatus of a UE in accordance with the present disclosure. Example process 500 is an example where the apparatus or the UE (for example, UE 120, UE 320, and/or UE 420) performs operations associated with UE Tx/Rx calibration in TDD using assistance information.

As shown in FIG. 5, in some aspects, process 500 may include receiving, from an assisting node, assistance information that relates to a transmit/receive (Tx/Rx) mismatch associated with the UE (block 510). For example, the UE (such as by using communication manager 140 or reception component 602, depicted in FIG. 6) may receive, from an assisting node, assistance information that relates to a Tx/Rx mismatch associated with the UE, as described above.

As further shown in FIG. 5, in some aspects, process 500 may include obtaining one or more Tx/Rx imbalance values associated with the UE in accordance with the assistance information received from the assisting node (block 520). For example, the UE (such as by using communication manager 140 or Tx/Rx calibration component 608, depicted in FIG. 6) may obtain one or more Tx/Rx imbalance values associated with the UE in accordance with the assistance information received from the assisting node, as described above.

As further shown in FIG. 5, in some aspects, process 500 may include estimating an effective uplink channel in accordance with a downlink channel estimate associated with a downlink reference signal and in accordance with the one or more Tx/Rx imbalance values associated with the UE (block 530). For example, the U (such as by using communication manager 140 or Tx/Rx calibration component 608, depicted in FIG. 6) may estimate an effective uplink channel in accordance with a downlink channel estimate associated with a downlink reference signal and in accordance with the one or more Tx/Rx imbalance values associated with the UE, as described above.

As further shown in FIG. 5, in some aspects, process 500 may include transmitting an uplink communication using a precoder associated with the estimated effective uplink channel (block 540). For example, the UE (such as by using communication manager 140 or transmission component 604, depicted in FIG. 6) may transmit an uplink communication using a precoder associated with the estimated effective uplink channel, as described above.

Process 500 may include additional aspects, such as any single aspect or any combination of aspects described below or in connection with one or more other processes described elsewhere herein.

In a first additional aspect, process 500 includes transmitting an SRS to the assisting node, wherein the assistance information that relates to the Tx/Rx mismatch associated with the UE indicates a version of the SRS received by the assisting node or an estimate of the effective uplink channel from the version of the SRS received by the assisting node.

In a second additional aspect, alone or in combination with the first aspect, process 500 includes receiving a CSI-RS from the assisting node, wherein obtaining the one or more Tx/Rx imbalance values associated with the UE includes calculating the one or more Tx/Rx imbalance values in accordance with a received version of the CSI-RS and the assistance information received from the assisting node.

In a third additional aspect, alone or in combination with one or more of the first and second aspects, process 500 includes estimating the one or more Tx/Rx imbalance values associated with the assisting node in accordance with the received version of the CSI-RS and the assistance information received from the assisting node, and transmitting, to the assisting node, feedback that indicates the one or more estimated Tx/Rx imbalance values associated with the assisting node.

In a fourth additional aspect, alone or in combination with one or more of the first through third aspects, process 500 includes receiving a CSI-RS from the assisting node, transmitting, to the assisting node, feedback that indicates a version of the received CSI-RS or an estimate of an effective downlink channel associated with the version of the received CSI-RS, and transmitting an SRS to the assisting node, wherein the assistance information that relates to the Tx/Rx mismatch associated with the UE indicates the one or more Tx/Rx imbalance values in accordance with the feedback and a version of the SRS received by the assisting node.

In a fifth additional aspect, alone or in combination with one or more of the first through fourth aspects, the feedback is carried in a MAC-CE or a PDU that has a header associated with calibrating the one or more Tx/Rx imbalance values.

In a sixth additional aspect, alone or in combination with one or more of the first through fifth aspects, transmitting the feedback and the SRS to the assisting node enables the assisting node to obtain one or more Tx/Rx imbalance values associated with the assisting node.

In a seventh additional aspect, alone or in combination with one or more of the first through sixth aspects, the assistance information is carried in a MAC-CE or a PDU that has a header associated with calibrating the one or more Tx/Rx imbalance values.

In an eighth additional aspect, alone or in combination with one or more of the first through seventh aspects, process 500 includes transmitting, to the assisting node, information that indicates a capability to calibrate the Tx/Rx mismatch associated with the UE.

In a ninth additional aspect, alone or in combination with one or more of the first through eighth aspects, the information transmitted to the assisting node indicates one or more Tx/Rx calibration procedures supported by the UE.

In a tenth additional aspect, alone or in combination with one or more of the first through ninth aspects, the information transmitted to the assisting node indicates a periodicity at which to perform one or more Tx/Rx calibration procedures.

In an eleventh additional aspect, alone or in combination with one or more of the first through tenth aspects, process 500 includes transmitting, to the assisting node, L1/L2 signaling that includes a request to calibrate the Tx/Rx mismatch associated with the UE.

In a twelfth additional aspect, alone or in combination with one or more of the first through eleventh aspects, process 500 includes receiving, from the assisting node, RRC signaling that includes configuration information to calibrate the Tx/Rx mismatch associated with the UE.

In a thirteenth additional aspect, alone or in combination with one or more of the first through twelfth aspects, the assisting node is an assisting network node that communicates with the UE over an access link or an assisting UE that communicates with the UE over a sidelink.

Although FIG. 5 shows example blocks of process 500, in some aspects, process 500 may include additional blocks, fewer blocks, different blocks, or differently arranged blocks than those depicted in FIG. 5. Additionally or alternatively, two or more of the blocks of process 500 may be performed in parallel.

Figure 6:
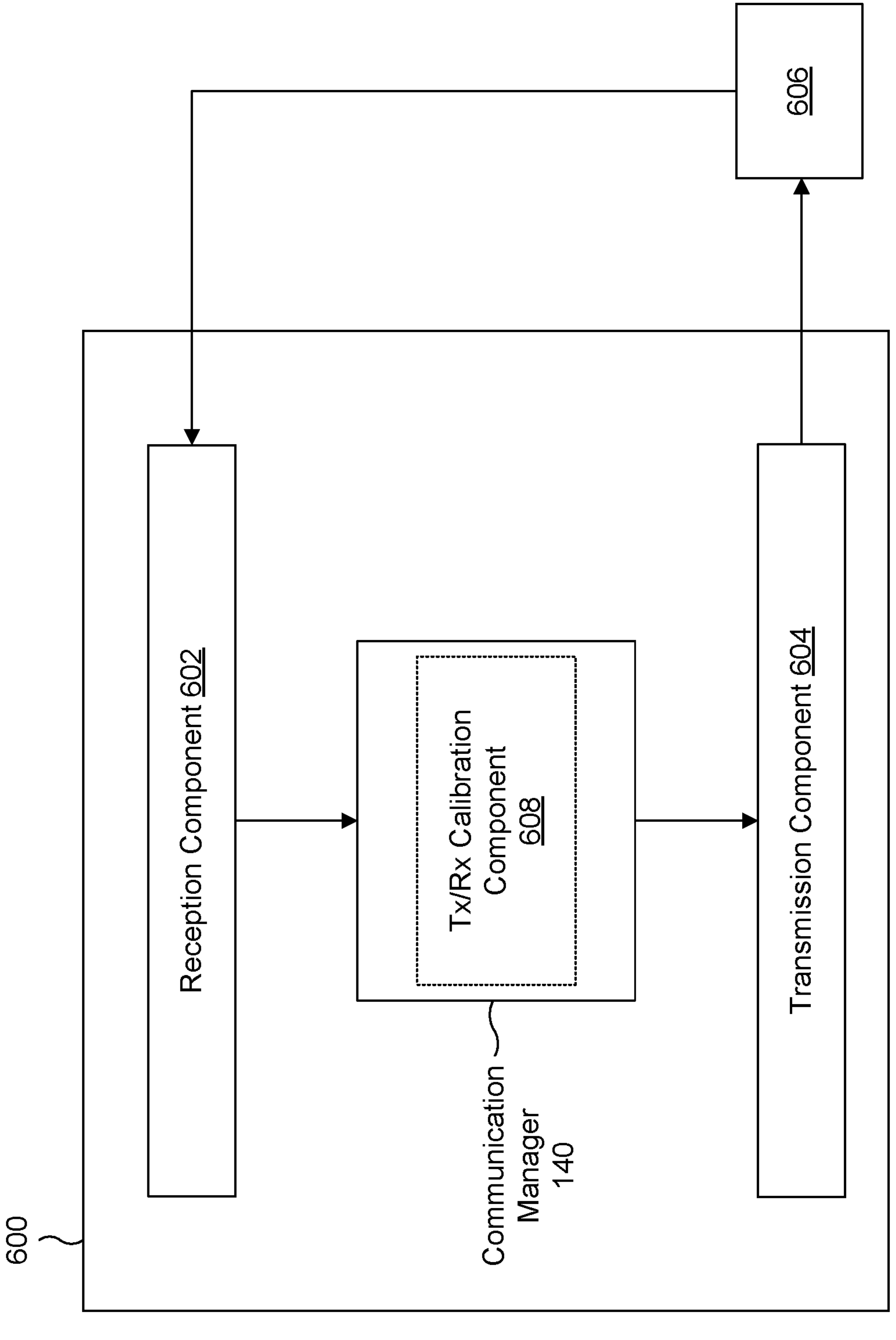
FIG. 6 is a diagram of an example apparatus for wireless communication in accordance with the present disclosure.

FIG. 6 is a diagram of an example apparatus 600 for wireless communication that supports UE Tx/Rx calibration in TDD using assistance information in accordance with the present disclosure. The apparatus 600 may be a UE, or a UE may include the apparatus 600. In some aspects, the apparatus 600 includes a reception component 602, a transmission component 604, and a communication manager 140, which may be in communication with one another (for example, via one or more buses). As shown, the apparatus 600 may communicate with another apparatus 606 (such as a UE, a network node, or another wireless communication device) using the reception component 602 and the transmission component 604.

In some aspects, the apparatus 600 may be configured to and/or operable to perform one or more operations described herein in connection with FIGS. 3A-3B and FIG. 4. Additionally or alternatively, the apparatus 600 may be configured to and/or operable to perform one or more processes described herein, such as process 500 of FIG. 5. In some aspects, the apparatus 600 may include one or more components of the UE described above in connection with FIG. 2.

The reception component 602 may receive communications, such as reference signals, control information, and/or data communications, from the apparatus 606. The reception component 602 may provide received communications to one or more other components of the apparatus 600, such as the communication manager 140. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 602 may include one or more antennas, one or more modems, one or more demodulators, one or more MIMO detectors, one or more receive processors, one or more controllers/processors, and/or one or more memories of the UE described above in connection with FIG. 2.

The transmission component 604 may transmit communications, such as reference signals, control information, and/or data communications, to the apparatus 606. In some aspects, the communication manager 140 may generate communications and may transmit the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, one or more modems, one or more modulators, one or more transmit MIMO processors, one or more transmit processors, one or more controllers/processors, and/or one or more memories of the UE described above in connection with FIG. 2. In some aspects, the transmission component 604 may be co-located with the reception component 602 in one or more transceivers.

The communication manager 140 may receive or may cause the reception component 602 to receive, from an assisting node, assistance information that relates to a Tx/Rx mismatch associated with the UE. The communication manager 140 may obtain one or more Tx/Rx imbalance values associated with the UE in accordance with the assistance information received from the assisting node. The communication manager 140 may estimate an effective uplink channel in accordance with a downlink channel estimate associated with a downlink reference signal and in accordance with the one or more Tx/Rx imbalance values associated with the UE. The communication manager 140 may transmit or may cause the transmission component 604 to transmit an uplink communication using a precoder associated with the estimated effective uplink channel. In some aspects, the communication manager 140 may perform one or more operations described elsewhere herein as being performed by one or more components of the communication manager 140.

The communication manager 140 may include one or more controllers/processors and/or one or more memories of the UE described above in connection with FIG. 2. In some aspects, the communication manager 140 includes a set of components, such as a Tx/Rx calibration component 608. Alternatively, the set of components may be separate and distinct from the communication manager 140. In some aspects, one or more components of the set of components may include or may be implemented within one or more controllers/processors and/or one or more memories of the UE described above in connection with FIG. 2. Additionally or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 602 may receive, from an assisting node, assistance information that relates to a Tx/Rx mismatch associated with the UE. The Tx/Rx calibration component 608 may obtain one or more Tx/Rx imbalance values associated with the UE in accordance with the assistance information received from the assisting node. The Tx/Rx calibration component 608 may estimate an effective uplink channel in accordance with a downlink channel estimate associated with a downlink reference signal and in accordance with the one or more Tx/Rx imbalance values associated with the UE. The transmission component 604 may transmit an uplink communication using a precoder associated with the estimated effective uplink channel.

The transmission component 604 may transmit an SRS to the assisting node, wherein the assistance information that relates to the Tx/Rx mismatch associated with the UE indicates a version of the SRS received by the assisting node or an estimate of the effective uplink channel from the version of the SRS received by the assisting node.

The reception component 602 may receive a CSI-RS from the assisting node, wherein obtaining the one or more Tx/Rx imbalance values associated with the UE includes calculating the one or more Tx/Rx imbalance values in accordance with a received version of the CSI-RS and the assistance information received from the assisting node.

The Tx/Rx calibration component 608 may estimate the one or more Tx/Rx imbalance values associated with the assisting node in accordance with the received version of the CSI-RS and the assistance information received from the assisting node. The transmission component 604 may transmit, to the assisting node, feedback that indicates the one or more estimated Tx/Rx imbalance values associated with the assisting node.

The reception component 602 may receive a CSI-RS from the assisting node. The transmission component 604 may transmit, to the assisting node, feedback that indicates a version of the received CSI-RS or an estimate of an effective downlink channel associated with the version of the received CSI-RS. The transmission component 604 may transmit an SRS to the assisting node, wherein the assistance information that relates to the Tx/Rx mismatch associated with the UE indicates the one or more Tx/Rx imbalance values in accordance with the feedback and a version of the SRS received by the assisting node.

The transmission component 604 may transmit, to the assisting node, information that indicates a capability to calibrate the Tx/Rx mismatch associated with the UE.

The transmission component 604 may transmit, to the assisting node, L1/L2 signaling that includes a request to calibrate the Tx/Rx mismatch associated with the UE.

The reception component 602 may receive, from the assisting node, RRC signaling that includes configuration information to calibrate the Tx/Rx mismatch associated with the UE.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally or alternatively, a set of (one or more) components shown in FIG. 6 may perform one or more functions described as being performed by another set of components shown in FIG. 6.

The following provides an overview of some Aspects of the present disclosure:

Aspect 1: A method for wireless communication by a UE, comprising: receiving, from an assisting node, assistance information that relates to a Tx/Rx mismatch associated with the UE; obtaining one or more Tx/Rx imbalance values associated with the UE in accordance with the assistance information received from the assisting node; estimating an effective uplink channel in accordance with a downlink channel estimate associated with a downlink reference signal and in accordance with the one or more Tx/Rx imbalance values associated with the UE; and transmitting an uplink communication using a precoder associated with the estimated effective uplink channel.

Aspect 2: The method of Aspect 1, further comprising: transmitting an SRS to the assisting node, wherein the assistance information that relates to the Tx/Rx mismatch associated with the UE indicates a version of the SRS received by the assisting node or an estimate of the effective uplink channel from the version of the SRS received by the assisting node.

Aspect 3: The method of Aspect 2, further comprising: receiving a CSI-RS from the assisting node, wherein obtaining the one or more Tx/Rx imbalance values associated with the UE includes calculating the one or more Tx/Rx imbalance values in accordance with a received version of the CSI-RS and the assistance information received from the assisting node.

Aspect 4: The method of Aspect 3, further comprising: estimating the one or more Tx/Rx imbalance values associated with the assisting node in accordance with the received version of the CSI-RS and the assistance information received from the assisting node; and transmitting, to the assisting node, feedback that indicates the one or more estimated Tx/Rx imbalance values associated with the assisting node.

Aspect 5: The method of any of Aspects 1-4, further comprising: receiving a CSI-RS from the assisting node; transmitting, to the assisting node, feedback that indicates a version of the received CSI-RS or an estimate of an effective downlink channel associated with the version of the received CSI-RS; and transmitting an SRS to the assisting node, wherein the assistance information that relates to the Tx/Rx mismatch associated with the UE indicates the one or more Tx/Rx imbalance values in accordance with the feedback and a version of the SRS received by the assisting node.

Aspect 6: The method of Aspect 5, wherein the feedback is carried in a MAC-CE or a PDU that has a header associated with calibrating the one or more Tx/Rx imbalance values.

Aspect 7: The method of Aspect 5, wherein transmitting the feedback and the SRS to the assisting node enables the assisting node to obtain one or more Tx/Rx imbalance values associated with the assisting node.

Aspect 8: The method of any of Aspects 1-7, wherein the assistance information is carried in a MAC-CE or a PDU that has a header associated with calibrating the one or more Tx/Rx imbalance values.

Aspect 9: The method of any of Aspects 1-8, further comprising: transmitting, to the assisting node, information that indicates a capability to calibrate the Tx/Rx mismatch associated with the UE.

Aspect 10: The method of Aspect 9, wherein the information transmitted to the assisting node indicates one or more Tx/Rx calibration procedures supported by the UE.

Aspect 11: The method of Aspect 9, wherein the information transmitted to the assisting node indicates a periodicity at which to perform one or more Tx/Rx calibration procedures.

Aspect 12: The method of any of Aspects 1-11, further comprising: transmitting, to the assisting node, L1/L2 signaling that includes a request to calibrate the Tx/Rx mismatch associated with the UE.

Aspect 13: The method of any of Aspects 1-12, further comprising: receiving, from the assisting node, RRC signaling that includes configuration information to calibrate the Tx/Rx mismatch associated with the UE.

Aspect 14: The method of any of Aspects 1-13, wherein the assisting node is an assisting network node that communicates with the UE over an access link or an assisting UE that communicates with the UE over a sidelink.

Aspect 15: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-14.

Aspect 16: An apparatus for wireless communication at a device, the apparatus comprising one or more memories and one or more processors coupled to the one or more memories, the one or more processors configured to cause the device to perform the method of one or more of Aspects 1-14.

Aspect 17: An apparatus for wireless communication, the apparatus comprising at least one means for performing the method of one or more of Aspects 1-14.

Aspect 18: A non-transitory computer-readable medium storing code for wireless communication, the code comprising instructions executable by one or more processors to perform the method of one or more of Aspects 1-14.

Aspect 19: A non-transitory computer-readable medium storing a set of instructions for wireless communication, the set of instructions comprising one or more instructions that, when executed by one or more processors of a device, cause the device to perform the method of one or more of Aspects 1-14.

Aspect 20: A device for wireless communication, the device comprising a processing system that includes one or more processors and one or more memories coupled with the one or more processors, the processing system configured to cause the device to perform the method of one or more of Aspects 1-14.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based on or otherwise in association with" unless explicitly stated otherwise. Also, as used herein, the term "or" is intended to be inclusive when used in a series and may be used interchangeably with "and/or," unless explicitly stated otherwise (for example, if used in combination with "either" or "only one of"). It should be understood that "one or more" is equivalent to "at least one."

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. A user equipment (UE) for wireless communication, comprising:

one or more antennas; and a processing system that includes one or more processors and one or more memories that store code for the one or more processors, the processing system configured to cause the UE to:

receive, from an assisting node, a first channel state information reference signal (CSI-RS);

transmit, to the assisting node, feedback that indicates the first CSI-RS or an estimate of an effective downlink channel associated with the first CSI-RS;

transmit, to the assisting node, a sounding reference signal (SRS) including one or more first transmit/receive (Tx/Rx) imbalance values that relates to a Tx/Rx mismatch associated with the UE and is in accordance with the feedback;

receive, from the assisting node, one or more second Tx/Rx imbalance values;

receive, from the assisting node, a second CSI-RS;

estimate an effective uplink channel in accordance with a downlink channel estimate associated with the second CSI-RS and in accordance with the one or more second Tx/Rx imbalance values; and transmit an uplink communication using a precoder associated with the estimated effective uplink channel.

2. The UE of claim 1, wherein the processing system is further configured to cause the UE to:

estimate one or more third Tx/Rx imbalance values associated with the assisting node in accordance with the first CSI-RS and information that relates to the Tx/Rx mismatch associated with the UE; and transmit, to the assisting node, feedback that indicates the estimated one or more third Tx/Rx imbalance values associated with the assisting node.

3. The UE of claim 1, wherein the feedback is carried in a medium access control (MAC) control element (MAC-CE)

or a protocol data unit (PDU) that has a header associated with calibrating the one or more first Tx/Rx imbalance values.

4. The UE of claim 1, wherein transmission of the feedback and the SRS to the assisting node enables the assisting node to obtain one or more third Tx/Rx imbalance values associated with the assisting node.

5. The UE of claim 1, wherein the assisting node is an assisting network node that communicates with the UE over an access link.

6. The UE of claim 1, wherein the processing system is further configured to cause the UE to:

transmit, to the assisting node, information that indicates a capability to calibrate the Tx/Rx mismatch associated with the UE.

7. The UE of claim 6, wherein the information transmitted to the assisting node indicates one or more Tx/Rx calibration procedures supported by the UE.

8. The UE of claim 6, wherein the information transmitted to the assisting node indicates a periodicity at which to perform one or more Tx/Rx calibration procedures.

9. The UE of claim 6, wherein the processing system is further configured to cause the UE to:

transmit, to the assisting node, Layer 1 or Layer 2 (L1/L2) signaling that includes a request to calibrate the Tx/Rx mismatch associated with the UE.

10. The UE of claim 6, wherein the processing system is further configured to cause the UE to:

receive, from the assisting node, radio resource control (RRC) signaling that includes configuration information to calibrate the Tx/Rx mismatch associated with the UE.

11. The UE of claim 1, wherein the feedback is included in a medium access control (MAC) control element (MAC-CE) or a protocol data unit (PDU) that has a header to indicate that a payload of the MAC-CE or the PDU carries the feedback indicating the first CSI-RS or the estimated effective downlink channel.

12. The UE of claim 1, wherein the processing system is further configured to cause the UE to:

estimate the downlink channel estimate based on the second CSI-RS.

13. The UE of claim 12, wherein the processing system is further configured to cause the UE to:

select the precoder based on the downlink channel estimate.

14. The UE of claim 1, wherein the assisting node is an assisting UE that communicates with the UE over a sidelink.

15. A user equipment (UE) for wireless communication, comprising:

one or more antennas; and a processing system that includes one or more processors and one or more memories that store code for the one or more processors, the processing system configured to cause the UE to:

receive, from an assisting node, assistance information that relates to a transmit/receive (Tx/Rx) mismatch associated with the UE;

obtain one or more Tx/Rx imbalance values associated with the UE in accordance with the assistance information received from the assisting node, wherein the assistance information is carried in a medium access control (MAC) control element (MAC-CE) or a protocol data unit (PDU) that has a header associated with calibrating the one or more Tx/Rx imbalance values;

estimate an effective uplink channel in accordance with a downlink channel estimate associated with a downlink reference signal and in accordance with the one or more Tx/Rx imbalance values associated with the UE; and transmit an uplink communication using a precoder associated with the estimated effective uplink channel.

16. A method for wireless communication by a user equipment (UE), comprising:

receiving, from an assisting node, a first channel state information reference signal (CSI-RS);

transmitting, to the assisting node, feedback that indicates the first CSI-RS or an estimate of an effective downlink channel associated with the first CSI-RS;

transmitting, to the assisting node, a sounding reference signal (SRS) including one or more first transmit/receive (Tx/Rx) imbalance values that relates to a Tx/Rx mismatch associated with the UE and is in accordance with the feedback;

receiving, from the assisting node, one or more second Tx/Rx imbalance values;

receiving, from the assisting node, a second CSI-RS;

estimating an effective uplink channel in accordance with a downlink channel estimate associated with the second CSI-RS and in accordance with the one or more second Tx/Rx imbalance values; and transmitting an uplink communication using a precoder associated with the estimated effective uplink channel.

17. The method of claim 16, further comprising:

estimating one or more third Tx/Rx imbalance values associated with the assisting node in accordance with the first CSI-RS and information that relates to the Tx/Rx mismatch associated with the UE; and transmitting, to the assisting node, feedback that indicates the estimated one or more third Tx/Rx imbalance values associated with the assisting node.

18. The method of claim 16, wherein the feedback is carried in a medium access control (MAC) control element (MAC-CE) or a protocol data unit (PDU) that has a header associated with calibrating the one or more first Tx/Rx imbalance values.

19. The method of claim 16, wherein transmitting the feedback and the SRS to the assisting node enables the assisting node to obtain one or more third Tx/Rx imbalance values associated with the assisting node.

20. The method of claim 16, wherein the assisting node is an assisting network node that communicates with the UE over an access link.

21. The method of claim 16, further comprising:

transmitting, to the assisting node, information that indicates a capability to calibrate the Tx/Rx mismatch associated with the UE.

22. The method of claim 21, wherein the information transmitted to the assisting node indicates one or more Tx/Rx calibration procedures supported by the UE.

23. The method of claim 21, wherein the information transmitted to the assisting node indicates a periodicity at which to perform one or more Tx/Rx calibration procedures.

24. The method of claim 21, further comprising:

transmitting, to the assisting node, Layer 1 or Layer 2 (L1/L2) signaling that includes a request to calibrate the Tx/Rx mismatch associated with the UE.

25. The method of claim 21, further comprising:

receiving, from the assisting node, radio resource control (RRC) signaling that includes configuration information to calibrate the Tx/Rx mismatch associated with the UE.

26. The method of claim 16, wherein the feedback is included in a medium access control (MAC) control element (MAC-CE) or a protocol data unit (PDU) that has a header to indicate that a payload of the MAC-CE or the PDU carries the feedback indicating the first CSI-RS or the estimated effective downlink channel.

27. The method of claim 16, further comprising:

estimating the downlink channel estimate based on the second CSI-RS.

28. The method of claim 27, further comprising:

selecting the precoder based on the downlink channel estimate.

29. The method of claim 16, wherein the assisting node is an assisting UE that communicates with the UE over a sidelink.

30. A method for wireless communication by a user equipment (UE), comprising:

receiving, from an assisting node, assistance information that relates to a transmit/receive (Tx/Rx) mismatch associated with the UE;

obtaining one or more Tx/Rx imbalance values associated with the UE in accordance with the assistance information received from the assisting node, wherein the assistance information is carried in a medium access control (MAC) control element (MAC-CE) or a protocol data unit (PDU) that has a header associated with calibrating the one or more Tx/Rx imbalance values;

estimating an effective uplink channel in accordance with a downlink channel estimate associated with a downlink reference signal and in accordance with the one or more Tx/Rx imbalance values associated with the UE; and transmitting an uplink communication using a precoder associated with the estimated effective uplink channel.

* * * * *